(12) United States Patent
Takeda et al.

(10) Patent No.: US 10,764,013 B2
(45) Date of Patent: Sep. 1, 2020

(54) USER TERMINAL, RADIO BASE STATION AND RADIO COMMUNICATION METHOD

(71) Applicant: NTT DOCOMO, INC., Tokyo (JP)

(72) Inventors: Kazuki Takeda, Tokyo (JP); Hiroki Harada, Tokyo (JP); Satoshi Nagata, Tokyo (JP); Tooru Uchino, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/854,457

(22) Filed: Dec. 26, 2017

(65) Prior Publication Data

US 2018/0145815 A1 May 24, 2018

Related U.S. Application Data

(63) Continuation of application No. PCT/JP2016/068855, filed on Jun. 24, 2016.

(30) Foreign Application Priority Data

Jun. 26, 2015 (JP) ................................ 2015-128735

(51) Int. Cl.
*H04L 5/00* (2006.01)
*H04W 72/04* (2009.01)
(Continued)

(52) U.S. Cl.
CPC ............... *H04L 5/0055* (2013.01); *H04L 1/16* (2013.01); *H04L 1/1671* (2013.01);
(Continued)

(58) Field of Classification Search
CPC ....... H04L 5/0055; H04L 1/1671; H04L 1/16; H04L 5/001; H04W 72/12; H04W 72/042;
(Continued)

(56) References Cited

U.S. PATENT DOCUMENTS 8,488,549 B2 * 7/2013 Yang ........................ H04L 1/18
370/329
9,106,419 B2 8/2015 Chen et al.
(Continued)

FOREIGN PATENT DOCUMENTS

JP 2013535939 A 9/2013

OTHER PUBLICATIONS

3GPP TS 36.213 v12.4.0, "E-UTRA, Physical Layer Procedures", Dec. 2014, 89 pages.*
(Continued)

*Primary Examiner* — Mounir Moutaouakil
(74) *Attorney, Agent, or Firm* — Osha Liang LLP

(57) ABSTRACT

A user terminal is disclosed including a transmitter that transmits delivery acknowledgment signals (ACK/NACK) in response to downlink (DL) signals transmitted from a plurality of cells, a receiver that receives information about cells to be scheduled, and a processor that controls transmission of the ACK/NACK based on the information about the cells to be scheduled. Further, a radio base station is disclosed that communicates with a user terminal using a plurality cells, the radio base station including a processor that controls scheduling of downlink (DL) signals transmitted respectively from the plurality of cells; a transmitter that transmits information about cells to be scheduled; and a receiver that receives delivery acknowledgement signals (ACK/NACK) transmitted from the user terminal based on the information about the cells to be scheduled.

15 Claims, 14 Drawing Sheets

(51) Int. Cl.
*H04L 1/16* (2006.01)
*H04W 28/04* (2009.01)
*H04W 72/12* (2009.01)
*H04W 88/02* (2009.01)
*H04W 88/08* (2009.01)

(52) U.S. Cl.
CPC ........... *H04W 28/04* (2013.01); *H04W 72/04* (2013.01); *H04W 72/042* (2013.01); *H04W 72/12* (2013.01); *H04L 5/001* (2013.01); *H04W 88/02* (2013.01); *H04W 88/08* (2013.01)

(58) Field of Classification Search
CPC ..... H04W 72/04; H04W 28/04; H04W 88/08; H04W 88/02
See application file for complete search history.

(56) References Cited

U.S. PATENT DOCUMENTS

| | | | | |
|---|---|---|---|---|
| 9,844,029 | B2* | 12/2017 | Suzuki | H04L 1/1861 |
| 9,882,684 | B2* | 1/2018 | Gauvreau | H04L 1/1893 |
| 9,888,465 | B2* | 2/2018 | Papasakellariou | H04W 72/042 |
| 9,907,060 | B2* | 2/2018 | Yang | H04L 1/1861 |
| 9,980,255 | B2* | 5/2018 | Cheng | H04L 1/0029 |
| 10,171,219 | B2* | 1/2019 | Fan | H04L 5/0055 |
| 2012/0039279 | A1* | 2/2012 | Chen | H04L 1/1861 370/329 |
| 2013/0201884 | A1* | 8/2013 | Freda | H04W 72/005 370/278 |
| 2014/0023000 | A1* | 1/2014 | Joung | H04W 72/042 370/329 |
| 2014/0161060 | A1 | 6/2014 | Nam et al. | |
| 2014/0247744 | A1* | 9/2014 | Agiwal | H04W 28/16 370/252 |
| 2014/0269452 | A1* | 9/2014 | Papasakellariou | H04B 7/2643 370/280 |
| 2014/0369242 | A1* | 12/2014 | Ng | H04L 5/0098 370/280 |
| 2015/0003302 | A1* | 1/2015 | Ekpenyong | H04W 72/14 370/280 |
| 2015/0043394 | A1* | 2/2015 | Lin | H04L 1/1861 370/280 |
| 2015/0092694 | A1* | 4/2015 | You | H04W 4/70 370/329 |
| 2015/0163797 | A1 | 6/2015 | Fu et al. | |
| 2016/0212734 | A1* | 7/2016 | He | H04L 5/0055 |
| 2016/0286547 | A1* | 9/2016 | Yang | H04L 1/1861 |
| 2016/0337110 | A1* | 11/2016 | Yang | H04L 1/1854 |

OTHER PUBLICATIONS

Office Action issued in corresponding Japanese Patent Application No. 2015-128735, dated Aug. 9, 2016 (13 pages).
Extended European Search Report issued in the counterpart European Patent Application No. 16814495.4, dated May 14, 2018 (11 pages).
Nokia Networks; "Dynamic adaptation of HARQ-ACK feedback size and PUCCH format"; 3GPP TSG-RAN WG1 Meeting #81, R1-152810; Fukuoka, Japan, May 25-29, 2015 (3 pages).
LG Electronics; "HARQ-ACK transmission for supporting CA of up to 32 carriers"; 3GPP TSG RAN WG1 Meeting #80, R1-150209; Athens, Greece, Feb. 9-13, 2015 (5 pages).
ZTE; "HARQ-ACK enhancement for CA with up to 32 CCs"; 3GPP TSG RAN WG1 Meeting #81, R1-152952; Fukuoka, Japan, May 25-29, 2015 (4 pages).
NTT Docomo, Inc.; "Summary of email discussion [82-03]: HARQ-ACK codebook determination"; 3GPP TSG RAN WG1 #82bis, R1-156129; Malmö, Sweden, Oct. 5-9, 2015 (14 pages).
3GPP TS 36.213 V12.6.0; "3rd Generation Partnership Project; Technical Specification Group Radio Access Network; Evolved Universal Terrestrial Radio Access (E-UTRA); Physical layer procedures (Release 12)"; Jun. 2015 (241 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
International Search Report issued in the corresponding International Application No. PCT/JP2016/068855, dated Aug. 16, 2016 (2 pages).
Written Opinion issued in the corresponding International Application No. PCT/JP2016/068855, dated Aug. 16, 2016 (12 pages).
Office Action issued in Australian Application No. 2016283374; dated Nov. 5, 2019 (4 pages).

* cited by examiner

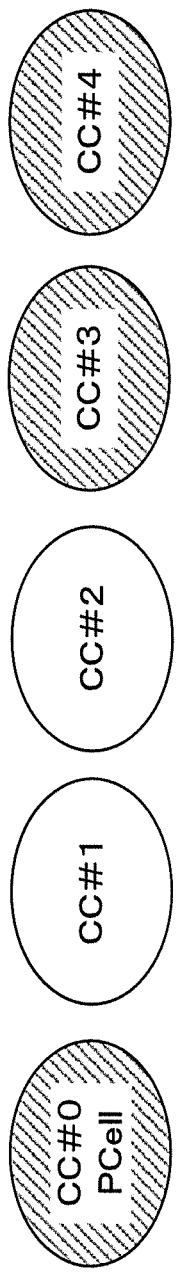
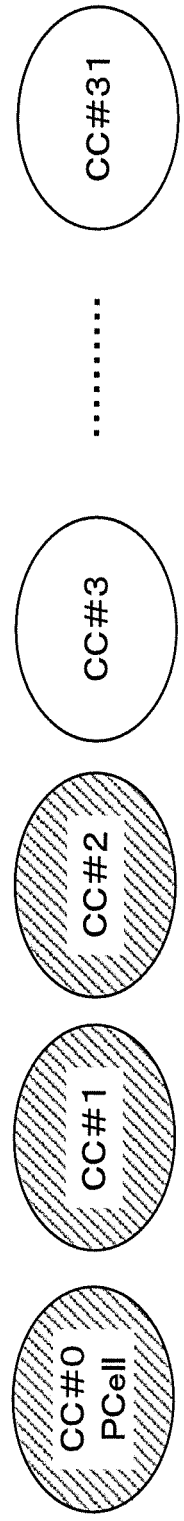
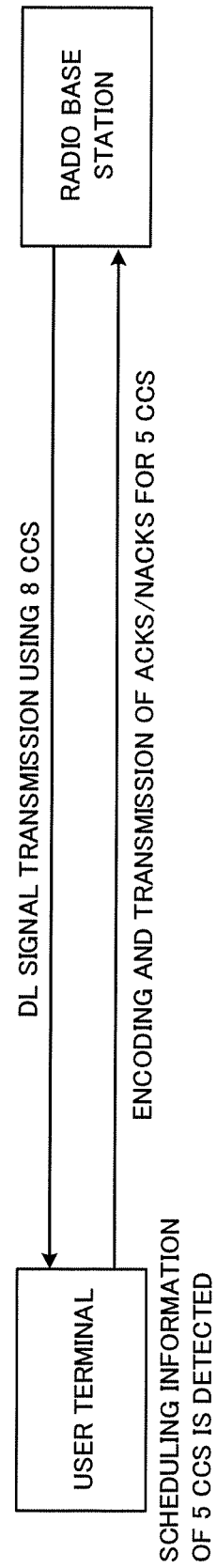

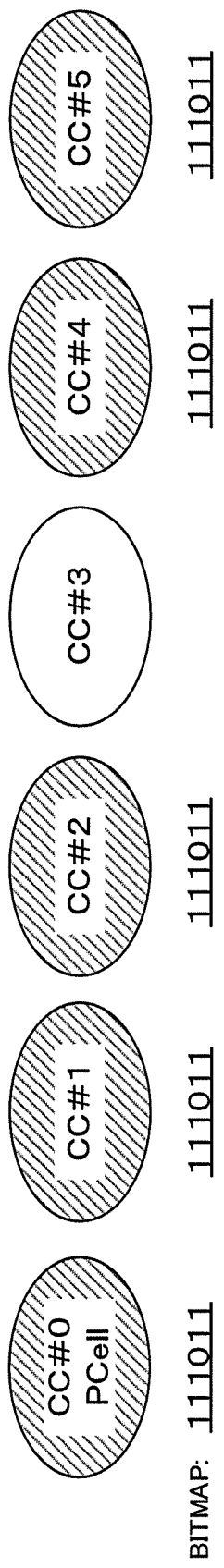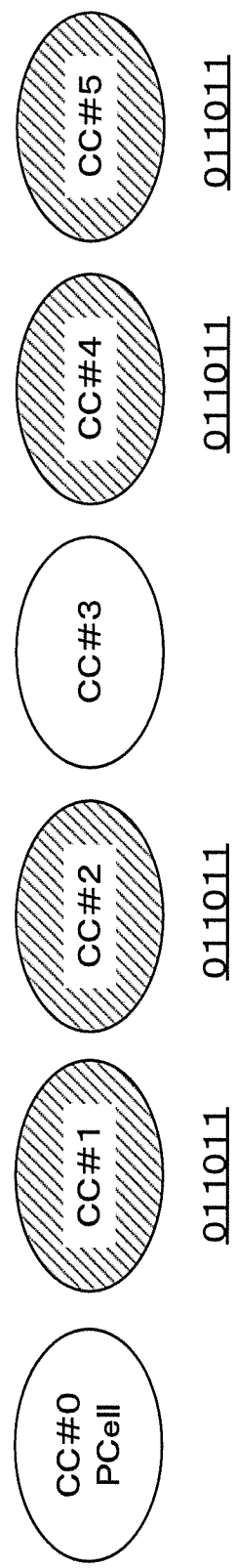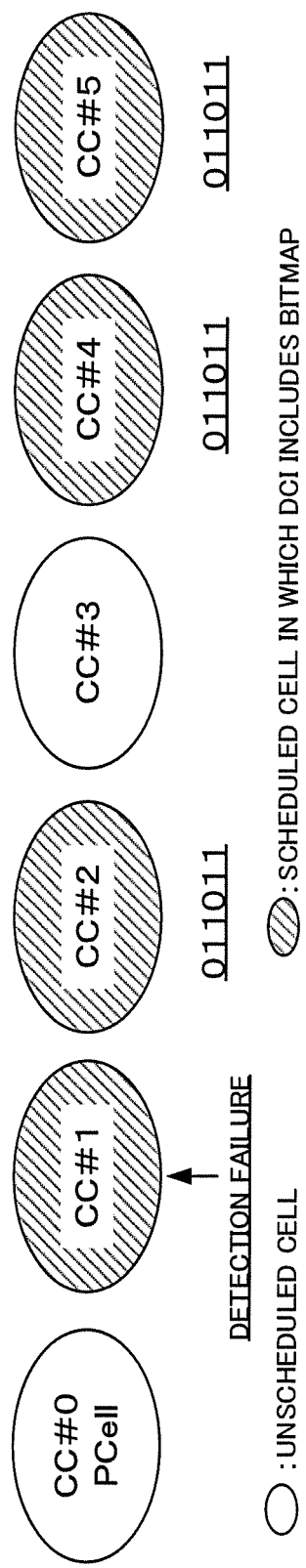

TDAI: IDAI=5

◯ : UNSCHEDULED CELL

▨ : SCHEDULED CELL IN WHICH DCI INCLUDES TDAI

TDAI: IDAI=5
ADAI: ADAI=1

: SCHEDULED CELL IN WHICH DCI INCLUDES TDAI AND ADAI

: UNSCHEDULED CELL

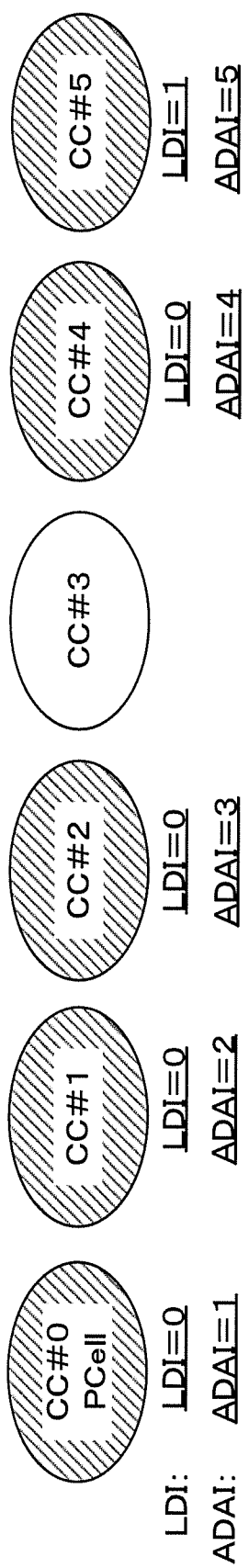
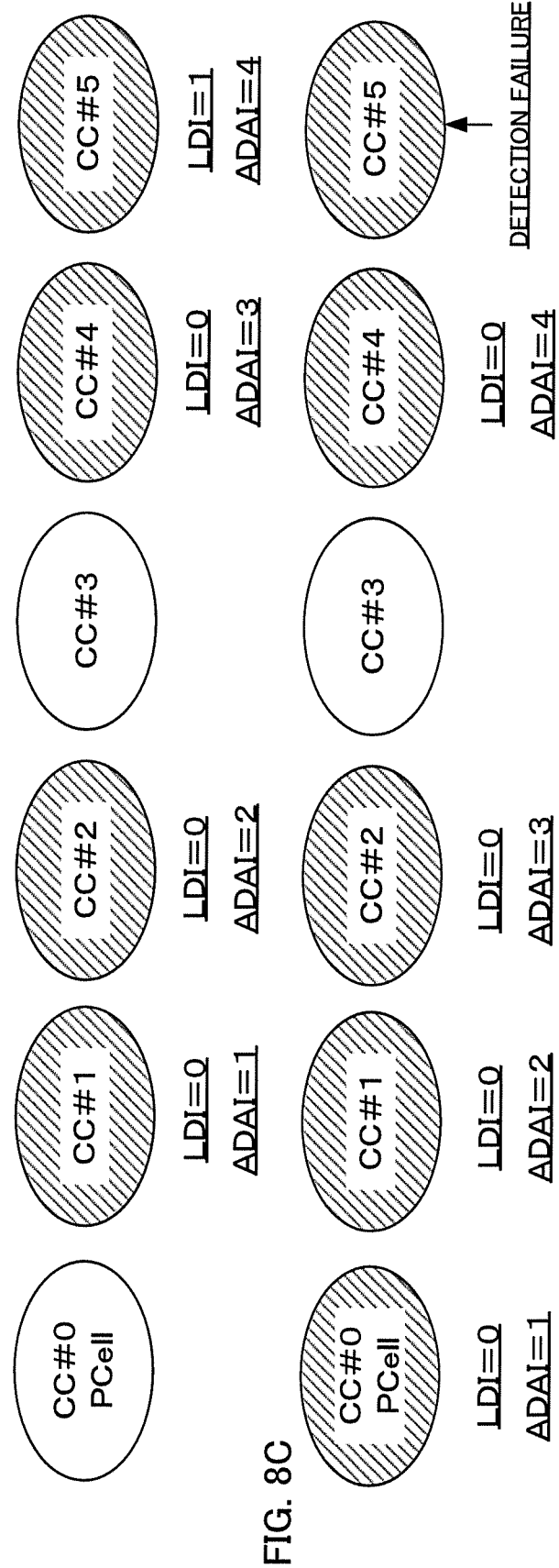

USER TERMINAL, RADIO BASE STATION AND RADIO COMMUNICATION METHOD

CROSS REFERENCE TO RELATED APPLICATIONS

The present application is a continuation application of PCT/JP2016/068855, filed on Jun. 24, 2016, which claims priority to Japanese Patent Application No. 2015-128735, filed on Jun. 26, 2015. The contents of these applications are incorporated by reference in their entirety.

TECHNICAL FIELD

One or more embodiments disclosed herein relate to a user terminal, a radio base station and a radio communication method in next-generation mobile communication systems.

BACKGROUND

In the Universal Mobile Telecommunications System (UMTS) network, the specifications of long term evolution (LTE) have been drafted for the purpose of further increasing high speed data rates, providing lower delays and so on (see non-patent literature 1). Also, successor systems of LTE (also referred to as, for example, "LTE-advanced" (hereinafter referred to as "LTE-A"), "FRA" (Future Radio Access) and so on) are under study for the purpose of achieving further broadbandization and increased speed beyond LTE.

The system configuration of LTE Rel. 10-12 includes at least one component carrier (CC), where the LTE system band constitutes one unit. Such bundling of a plurality of component carriers (cells) into a wide band is referred to as "carrier aggregation" (CA). In LTE Rel. 10-12 systems, CA to use maximum 5 CCs is utilized.

In LTE systems, hybrid automatic repeat request (HARQ: Hybrid Automatic Repeat reQuest) is supported in order to suppress degradation of communication quality due to signal reception failures in radio communication between a user terminal (UE) and a radio base station (eNB). For example, a user terminal feeds back delivery acknowledgment signals (referred to as "HARQ-ACKs," and also referred to as "ACK/NACKs") depending on the condition of reception of downlink (DL) signals transmitted from a radio base station. There is a rule that, when the user terminal transmits HARQ-ACKs in an uplink control channel (PUCCH), the user terminal uses predetermined PUCCH formats according to the number of CCs (or cells) and so on (see non-patent literature 2).

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2" Non-Patent Literature 2: 3GPP TS 36.213 "Evolved Universal Terrestrial Radio Access (E-UTRA) Physical layer procedures (Release 12)"

SUMMARY

In existing LTE systems (Rel. 12 or earlier versions), the bit size of ACK/NACK (also referred to as the "code book size" and the "bit sequence size") that are fed back by a user terminal is semi-statically determined in advance, based on information reported from a radio base station through higher layer signaling (the number of CCs and so on). Therefore, when applying CA, the user terminal feeds back ACK/NACK in a codebook size that is fixedly determined based on the number of CCs and so on. Therefore, when the number of CCs configured in the user terminal and the number of CCs where DL signals are scheduled in a given subframe are different, the codebook size cannot be changed in the user terminal, and this might lead to the case where the size of ACK/NACK that are transmitted is larger than necessary. Also, although, in Rel. 12 and earlier versions, the maximum number of CCs that can be configured at the time of CA was 5, in Rel. 13 and later versions, it is assumed that the number of CCs that can be configured is expanded, and there is a possibility that the number of CCs that are configured and the number of CCs scheduled in a given subframe differ significantly.

Meanwhile, it may be possible to dynamically control the codebook size of HARQ-ACKs to feed back, based on, for example, DL signals received in the user terminal (for example, based on the number of CCs where DL signals are received). However, if the user terminal fails to detect DL signals or makes error detection, this may lead to the situation where the recognition of the codebook size differs between the radio base station and the user terminal. In this case, there is a possibility that the radio base station is unable to properly decode the ACK/NACK fed back from the user terminal, and the quality of communication may be lowered.

One or more embodiments disclosed herein have been made in view of the above. Embodiments disclosed herein provide a user terminal, a radio base station and a radio communication method that enable of adequate feedback of HARQ-ACKs and that can prevent the decrease of communication quality even when a plurality of component carriers are configured in a radio communication system.

According to one aspect of embodiments disclosed herein, a user terminal has a transmission section that transmits ACK/NACK in response to DL signals transmitted from a plurality of cells, a receiving section that receives information about cells to be scheduled, and a control section that controls transmission of the ACK/NACK based on the information about the cells to be scheduled.

According to one aspect, it is possible to feed back HARQ-ACKs adequately and prevent the decrease of communication quality even when a plurality of component carriers are configured in a radio communication system.

According to one aspect, embodiments disclosed herein include a user terminal with a transmitter that transmits delivery acknowledgement signals (ACK/NACK) in response to downlink (DL) signals transmitted from a plurality of cells. The user terminal also includes a receiver that receives information about cells to be scheduled; and a processor that controls transmission of the ACK/NACK based on the information about the cells to be scheduled.

In one aspect, the processor controls a bit size of the ACK/NACK to feed back based on the information about the cells to be scheduled.

In one aspect, the information about the cells to be scheduled includes a value that corresponds to a total number of cells to be scheduled in one predetermined subframe.

In one aspect, the information about the cells to be scheduled includes a cumulative number of cells to be scheduled in the one predetermined subframe.

In one aspect, the receiver receives the information about the cells to be scheduled in downlink control information (DCI) of the cells to be scheduled.

In one aspect, a value that corresponds to a total number of cells to be scheduled is included, in a same value, in the downlink control information of all cells that are to be scheduled.

In one aspect, when a maximum value of the cumulative number and the value that corresponds to the total number of cells to be scheduled are different, the processor judges that detection has failed in a predetermined cell.

In one aspect, when a cumulative number for the predetermined cell is not received, the processor judges to feed back a NACK in response to a DL signal from the predetermined cell.

In one aspect, when the cumulative number is not included in the downlink control information, the processor controls the transmission of the ACK/NACK using PUCCH format 1a/1b.

In one aspect, when the downlink control information is transmitted in a common search space, the receiver detects the downlink control information assuming that the value that corresponds to the total number of cells to be scheduled in one predetermined subframe and the cumulative number of cells are not included in the downlink control information.

In one aspect, when the receiver detects the downlink control information only in a common search space, the processor controls the transmission of the ACK/NACK by applying PUCCH format 1a/1b.

In another aspect, embodiments disclosed herein include a radio base station that communicates with a user terminal using a plurality cells. The radio base station includes a processor that controls scheduling of downlink (DL) signals transmitted respectively from the plurality of cells, and a transmitter that transmits information about cells to be scheduled. The radio base station also includes a receiver that receives delivery acknowledgement signals (ACK/NACK) transmitted from the user terminal based on the information about the cells to be scheduled.

In another aspect, embodiments disclosed herein include a radio communication method for a user terminal that communicates by connecting with a plurality of cells. The method includes receiving information about cells to be scheduled, and transmitting delivery acknowledgement signals (ACK/NACK) in response to downlink (DL) signals transmitted from the plurality of cells based on the information about the cells to be scheduled. In one aspect, the information about the cells to be scheduled comprises a value that corresponds to a total number of cells to be scheduled in one predetermined subframe.

In one aspect, the receiver receives the information about the cells to be scheduled in a Medium Access Control Control Element (MAC CE).

In one aspect, when the value that corresponds to the total number of cells to be scheduled are not included in the downlink control information, the processor controls the transmission of the ACK/NACK using PUCCH format 1a/1b.

In one aspect, when a maximum value of the cumulative number and the value that corresponds to the total number of cells to be scheduled are different, the processor judges that detection has failed in a predetermined cell.

In one aspect, when a cumulative number for the predetermined cell is not received, the processor judges to feed back a NACK in response to a DL signal from the predetermined cell.

BRIEF DESCRIPTION OF DRAWINGS

FIGS. 1A, 1B, and 1C are diagrams showing downlink scheduling in a plurality of CCs;

FIGS. 2A, 2B, and 2C are diagrams illustrating the status of scheduling in each CC according to the first example of the first embodiment, and the information contained in the DCI transmitted in each CC;

FIGS. 8A, 8B, and 8C are diagrams illustrating the status of scheduling in each CC according to the first example of a fourth embodiment, and the information contained in the DCI transmitted in each CC;

DETAILED DESCRIPTION

Figure 3A:
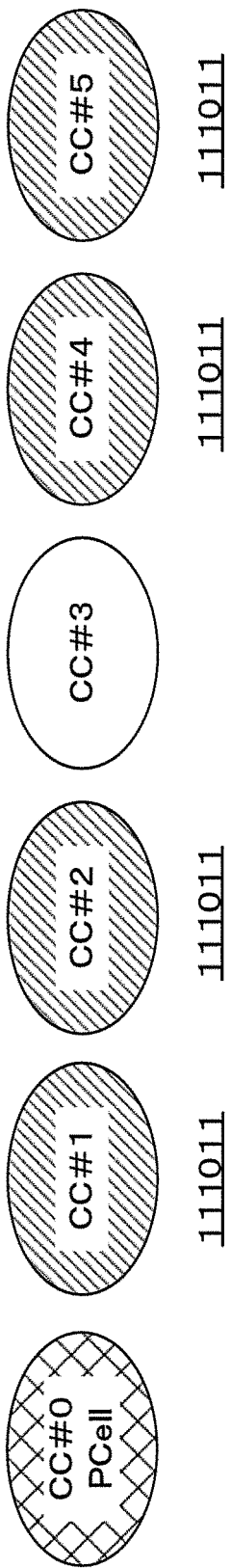
FIGS. 3A, 3B, and 3C are diagrams illustrating the status of scheduling in each CC according to a second example of the first embodiment, and the information contained in the DCI transmitted in each CC.

In LTE systems, retransmission control (HARQ-ACK (Hybrid Automatic Repeat reQuest Acknowledgment), ACK/NACK (ACKnowledgments/Negative ACKnowledgment), etc.) is supported in wireless communication between user terminals and radio base stations using a plurality of CCs (cells). For example, a DL signal is transmitted from a radio base station to a user terminal, and the user terminal feeds back delivering acknowledgment signals, an ACK/NACK (or DTX), to the radio base station based on the reception result of the DL signal.

In LTE systems, a plurality of PUCCH formats for allowing user terminals to transmit ACK/NACK (HARQ-ACKs) to radio base stations by using an uplink control channel (PUCCH) are defined. Here, ACK/NACKs are formed with a bit sequence of a predetermined length, comprised of bits that represent ACKs or NACKs.

For example, when PUCCH format 1a/1b is configured in the user terminal, the user terminal transmits an ACK/NACK signal in a PUCCH resource that corresponds to a CCE/ECCE (Control Channel Element/Enhanced CCE) index of the control channel (PDCCH/EPDCCH) that schedules the PDSCH, without encoding.

Also, when PUCCH format 3 is configured in the user terminal, the user terminal interprets the TPC (Transmit Power Control) command bit included in the PDCCH/EPDCCH of an SCell, as an ARI (Ack/nack Resource Indicator), and transmits an ACK/NACK signal using one PUCCH resource that is specified by the ARI among four resources that are configured by higher layer signaling. At this time, the value of the ARI may be the same between PDCCHs and EPDCCHs that schedule the PDSCHs of different SCells. In PUCCH format 3, when Frequency Division Duplex (FDD) is used, a codebook size of maximum 10 bits is configured, and, when Time Division Duplex (TDD) is used, a codebook size of maximum 21 bits is configured, and these are used for ACK/NACK.

In existing systems (LTE Rel. 10 to 12), as mentioned earlier, the codebook size of HARQ-ACKs (ACK/NACK bit sequence) to be transmitted on the PUCCH is determined semi-statically based on information reported by higher layer signaling.

In the case of using FDD, the overall ACK/NACK (A/N) bit size is determined based on the number of CCs configured by RRC signaling and the Transmission Mode (TM), which indicates whether Multiple Input Multiple Output (MIMO) is applicable in each CC. In this case, the user terminal transmits the ACK/NACK bit sequence based on higher layer signaling regardless of the number of CCs to be scheduled.

In the case of using TDD, in addition to the above case of using FDD, the overall ACK/NACK bit sequence size is determined based on the number of DL subframes subject to feedback of delivery acknowledgment signals (ACK/NACK) per PUCCH in one UL subframe. The user terminal transmits the ACK/NACK bit sequence based on higher layer signaling, irrespective of the number of CCs to be scheduled and the number of subframes included in the scheduling information.

In this way, when the bit size of ACK/NACK to be fed back is determined based on information reported by higher layer signaling, the situation might arise where the ACK/NACK bit size does not match the number of CCs actually scheduled in the user terminal.

For example, assume the case where five CCs (CCs #0 to #4) are configured in the user terminal that uses CA, and where a DL signal is transmitted to the user terminal using 3 CCs (CCs #0, #3 and #4) in a given subframe (see FIG. 1A). In the example shown in FIG. 1A, only three CCs—CC #0, CC #3 and CC #4—are scheduled. However, since the ACK/NACK size reported from higher layer signaling corresponds to five CCs, the user terminal transmits ACK/NACK for five CCs. In this case, since the PDCCHs/EPDCCHs corresponding to unscheduled CCs (CC #1 and CC #2) cannot be detected, the user terminal determines that NACKs should be fed back. In existing systems, even when the ACK/NACK codebook size to match the CCs that are actually scheduled (CCs where DL signals are transmitted) is different from the codebook size reported by higher layer signaling, the user terminal still cannot change the codebook size.

Now, in CA in LTE Rel. 10 to 12, the number of CCs that can be configured per user terminal is limited to maximum of five. On the other hand, in LTE Rel. 13 and beyond, in order to realize more flexible and faster wireless communication, a study is in progress to reduce the limit on the number of CCs that can be configured in a user terminal and to configure 6 or more CCs (more than five CCs, up to, for example, 32 CCs). Here, carrier aggregation in which six or more CCs can be configured may be referred to as, for example, "enhanced CA," "Rel. 13 CA," and so on.

As described above, when the number of CCs to be configured is expanded, it is possible that the gap between the number of CCs to be configured and the number of CCs scheduled in each subframe increases. If the number of CCs where DL signals are scheduled is less than the number of CCs to be configured and the codebook size is determined semi-statically as in conventional cases, most of the ACK/NACK transmitted from the user terminal are NACKs. For example, FIG. 1B shows a case where 32 CCs are configured in the user terminal and where the number of CCs actually scheduled is 3 (CCs #0 to #2). In this case, the number of actually scheduled cells (three CCs) is smaller than the total number of CCs (32 CCs), and most of the CCs have NACKs.

Also, the smaller the ACK/NACK codebook size, the smaller the amount of information transmitted by the user terminal. Therefore, if the codebook size of ACK/NACK can be reduced, the quality of communication (SINR: Signal to Interference plus Noise Power Ratio) required in radio transmission can be kept low. For example, in CA using five CCs at a maximum, the SINR required in ACK/NACK transmission can be kept low by decreasing the codebook size of ACK/NACK fed back by the user terminal according to the CCs that are scheduled.

Therefore, it is effective to make it possible to dynamically change the codebook size of ACK/NACK (HARQ-ACKs) that the user terminal feeds back, according to the number of CCs that are scheduled.

In the case where the codebook size of ACK/NACK to be fed back by the user terminal can be changed dynamically, for example, the user terminal dynamically changes the number of ACK/NACK bits according to the number of scheduled CCs and so on. As a method of dynamically changing the number of ACK/NACK bits in this manner, for example, the user terminal (UE) may determine the number of ACK/NACK bits based on the number of PDSCH-scheduling PDCCHs/EPDCCHs detected. The number of ACK/NACK bits may be the same as the number of PDCCHs/EPDCCHs detected, or may be determined considering higher layer signaling information (for example, application of MIMO), in addition to the number of PDCCHs/EPDCCHs scheduling PDSCHs for each CC. In this case, the ACK/NACK codebook size in the user terminal can be appropriately reduced according to the number of CCs scheduled.

Incidentally, in a PUCCH format (for example, format 3) for use for ACK/NACK to which CA is applied, the ACK/NACK bit sequence is subjected to error correction coding (for example, block coding) and transmitted. Therefore, if the recognition of the codebook size does not match between the user terminal that performs encoding and the radio base station that performs decoding, the radio base station cannot correctly decode the ACK/NACK fed back from the user terminal.

For example, when a detection failure or error detection occurs and the user terminal recognizes a number of CCs different from the number of CCs that are actually scheduled, the situation arises where the recognition of the codebook (bit sequence) size does not match between the radio base station and the user terminal (see FIG. 1C). FIG. 1C shows a case where, although the radio base station performs scheduling (DL signal transmission) for the user terminal by using 8 CCs, the user terminal detects only the PDCCHs/EPDCCHs (scheduling information) of five CCs. That is, the user terminal fails to detect the DL signals (for example, PDCCHs/EPDCCHs) of 3 CCs.

If the ACK/NACK codebook size is determined based on the DL signals (the number of CCs) detected by the user terminal, the user terminal transmits an ACK/NACK bit sequence for the five CCs detected, to the radio base station. For this reason, the radio base station cannot perform decoding properly, and the entire ACK/NACK bit sequence is affected, and the quality of feedback using ACK/NACK is severely deteriorated.

In this way, when the user terminal fails to detect a DL signal transmitted from the radio base station in a predetermined CC, the user terminal judges the number of CCs allocated smaller than the number of CCs in which DL signals are transmitted from the radio base station. Further, when the user terminal make error detection of DL signals transmitted from the radio base station, the user terminal judges the number of CCs allocated bigger than the number of CCs in which DL signals are transmitted from the radio base station.

Therefore, although the method of determining the codebook size of ACK/NACK to transmit from the user terminal based on the number of PDCCHs/EPDCCHs detected is easy to implement, when detection failures or error detections occur, the recognition of the codebook size does not match between the radio base station and the user terminal. In this case, as described above, the quality of feedback based on ACK/NACK deteriorates, and the quality of communication may be severely deteriorated.

Therefore, the problem when communicating by dynamically changing the codebook size of ACK/NACK is how to match the codebook size between the user terminal and the radio base station.

Therefore, the present inventors have come up with the idea of reporting information about the cells to be scheduled to the user terminal, and allowing the user terminal to control the codebook size of ACKs/NACK to transmit based on the information about the cells to be scheduled.

According to one or more embodiments disclosed herein, a user terminal receives information about the cells to be scheduled and controls ACK/NACK feedback to the radio base station based on the information about the cell to be scheduled. For example, the radio base station can include information about the cells to be scheduled in downlink control information (DCI) that is transmitted in a downlink control channel (PDCCH and/or EPDCCH), and report this to the user terminal. Based on the control information included in the PDCCH/EPDCCH, the user terminal decodes the PDSCH transmitted in a predetermined cell. Therefore, the user terminal controls (generates) ACK/NACK in response to DL signals transmitted from a plurality of cells based on the information pertaining to the cell to be scheduled, among multiple cells included in the DCI, and based on the decoded PDSCH, and transmits the ACK/NACK to the radio base station.

Since the ACK/NACK feedback to the radio base station is controlled based on the information about the cell to be scheduled, which is transmitted on the downlink as described above, it is possible to dynamically change the codebook size of ACK/NACK, and it is furthermore possible to match the recognition of the target codebook size between the radio base station and the user terminal. Thus, even in the case where a plurality of component carriers are configured in a radio communication system, HARQ-ACKs can be properly fed back, and the deterioration in communication quality can be suppressed.

Now, embodiments of the present invention will be described below. In the following description, examples will be in which information about scheduling-target cells is transmitted from the radio base station to the user terminal by using Downlink Control Information (DCI) included in the PDCCH or the EPDCCH, embodiments of the present invention are not limited to this. For example, information about scheduling-target cells may be transmitted using DownLink Medium Access Control Control Element (DL MAC CE). In addition, the information on scheduling-target cells has only to be information that pertains to a cell (or CC) to be scheduled, and, for example, information to represent the cell index of a scheduled cell (CC) can be used. Alternatively, when a plurality of CCs are classified into predetermined groups, information about a cell group including at least a scheduling-target cell can be used.

Furthermore, although, in the embodiments described below, one Primary Cell (PCell) and five Secondary Cells (Scells) will be used as CCs (or cells) for use in radio communication, the number of cells is not limited to this. For example, 6 or more CCs (for example, maximum 32 CCs) may be used. In addition, although PUCCH format 3 can be used for HARQ-ACK feedback, this is not limiting. It is equally possible to use a new PUCCH format having larger capacity than PUCCH format 3. When dual connectivity (DC) is used, MCG to include PCell and SCG to include PSCell that transmits the PUCCH are classified, but it is also possible to replace PSCell with PCell and apply this to SCG. Also, the number and arrangement of cells to be scheduled, the indices of cells to be scheduled, and the signals to be transmitted are not limited to those in the following examples. Further, the predetermined CC in the second example of each embodiment is not limited to the examples shown below.

Hereinafter, as embodiments of the present invention, first to fourth exemplary embodiments will be described with reference to the drawings. The information about the cells to be scheduled, included in DCI, is different in each of the following embodiments. In addition, the first to fourth embodiments may be used alone or in combination.

First Embodiment

In the first embodiment, a description will be given of a case where information about the cells to be scheduled is transmitted from a radio base station to a user terminal by using a bit-map scheme. In the following description, examples will be shown in which, CC #0, which is the PCell, and CCs #1 to #5, which are SCells, together a total of 6 cells, are configured in the user terminal (here, "#" represents the cell index).

First Example

A first example of the first embodiment will be described with reference to FIGS. 2A, 2B and 2C. FIGS. 2A, 2B and 2C are diagrams showing the status of scheduling (DL signal transmission) for each CC, and the bitmap information included in DCI, in a given subframe.

In the first example, the radio base station includes a bit map that shows the CCs to be scheduled, in DCI that is transmitted in all the CCs that are scheduled. FIG. 2 shows an example of configuring a bitmap so that a "1" indicates a CC to be scheduled and a "0" indicates a CC not to be scheduled, among the CCs configured.

For example, in FIG. 2A, CCs #0 to #2, #4 and #5 are the CCs to be scheduled, and CC #3 is a CC not scheduled. In this case, the scheduling status of these CCs can be expressed as a bit map "111011" based on the order of cell indices. The radio base station transmits DCI including the bit map to the user terminal in the DL of each CC to be scheduled. Note that, as a configuration of the bitmap, the arrangement of the bitmap assumes the order of the cell indexes of the CCs configured in the user terminal, but the present invention is not limited to this.

In FIG. 2B, CCs #1, #2, #4, and #5 are the CCs to be scheduled. In this case, the bitmap is represented as "011011," and DCI including the bitmap is transmitted from the radio base station to the user terminal via each scheduling-target CC (CCs #1, #2, #4 and #5).

The user terminal recognizes the CCs to be scheduled based on the information of "1" (or "0") included in the DCI bitmap. Also, the user terminal can determine the codebook size based on the number of CCs to be scheduled. For example, in FIG. 2A, since the number of CCs that are scheduled is five, if the number of transport blocks (or the number of codewords) of each CC is 1, the user terminal can give the ACK/NACK codebook a size of 5, and feed back ACK/NACK.

Also, the user terminal determines whether or not data transmitted from the radio base station has been properly received, based on the decoding results of received DL signals (for example, the PDSCH). Then, the user terminal generates ACK/NACK based on the location information of "1" (or "0") included in the bit map in the DCI, and PDSCH decoding results.

When the number of DL signals (PDCCHs/EPDCCHs) which user terminal detects does not match the number indicated by the bit map included in DCI, the user terminal generates ACK/NACK based on the bit map included in the DCI. For example, assume the case where CCs #1, #2, #4, and #5 are the CCs to be scheduled, and where the user terminal successfully detects the DL signals (for example, PDCCHs/EPDCCHs) of CC #2, #4 and #5, but fails to detect the DL signal of CC #1 (see FIG. 2C). In this case, although the number of CCs where the user terminal can detect DL signals is three, the bit map in the DCI transmitted in each CC is "011011." In this case, based on the number of "1's" included in the DCI, the user terminal determines that the codebook size of ACK/NACK is 4 (when the number of transport blocks is 1), and feeds back ACK/NACK. Also, the user terminal can decide to send a NACK to CC #1 whose PDCCH/EPDCCH the user terminal could not detect.

In this way, the user terminal determines the ACK/NACK codebook size and decides between ACKs and NACKs based on information about scheduling-target cells, so that, even when the user terminal fails to detect DL signals, it is still possible to match the recognition of the codebook size between the user terminal and the radio base station. By this means, the radio base station can appropriately decode the ACK/NACK transmitted from the user terminal to the radio base station, so that the deterioration of the quality of communication can be suppressed.

Second Example

Figure 3B:
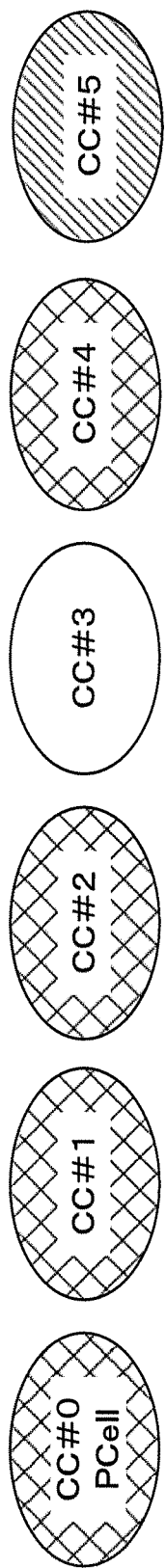
Figure 3C:
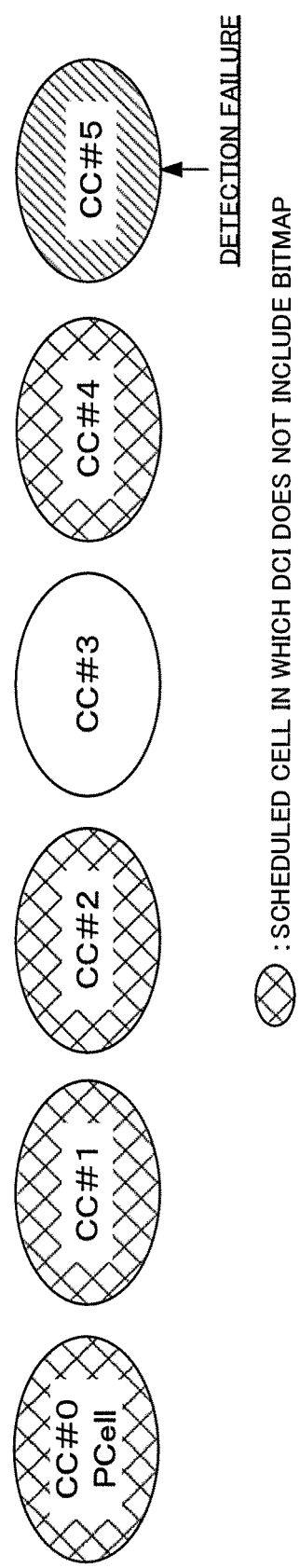

A second example of the first embodiment will be described with reference to FIGS. 3A, 3B, and 3C. FIGS. 3A, 3B, and 3C are diagrams showing the status of scheduling (DL signal transmission) and the bitmap information included in the DCI in each CC in a given subframe.

In the second example, the radio base station includes a bit map that shows the CCs to be scheduled in DCI transmitted in predetermined CCs (predetermined cells) among the CCs that are scheduled. That is, even among the CCs to be scheduled, there are CCs in which the DCI does not include a bitmap.

For example, in the case shown in FIG. 3A, although CCs #0 to #2, #4, and #5 are the CCs to be scheduled, the bit map is not included in the DCI of CC #0, which is the PCell. That is, the radio base station transmits DCI including a bit map in predetermined CCs (scheduling SCells) other than the PCell. In this case, it is possible to suppress an increase in the overhead of DCI in the PCell where communication concentrates during CA.

In FIG. 3A, when DCI including a bitmap is detected, the user terminal can judge the number of CCs scheduled, based on the bitmap, and determine the number of ACK/NACK bits to feed back. Further, the user terminal can identify the CCs to be scheduled based on the bit map included in the DCI. On the other hand, when DCI including a bitmap cannot be detected (for example, when only the DCI of the PCell is detected), the user terminal cannot judge whether or not SCells are scheduled, and therefore the user terminal may feed back ACK/NACK only in response to DL signals from the PCell, using existing PUCCH format 1a/1b (fallback operation). In this case, if the PDCCH/EPDCCH of the PCell cannot be detected either, the user terminal does not have to transmit ACK/NACK (DTX).

FIG. 3B shows a different mode of the second example. In FIG. 3B, although CCs #0 to #2, #4 and #5 are the CCs to be scheduled, the radio base station does not include a bit map in the DCIs of CCs #0 to #2 and #4, and includes a bit map in the DCI of CC #5 and CCs beyond this (CCs having a cell index of 5 or more). When the user terminal detects the bit map "111011" in the DCI of CC #5, the user terminal can judge the number of scheduled CCs based on the detected bitmap, and determine the number of ACK/NACK bits to feed back.

In FIG. 3B, if the user terminal cannot detect DCI including a bitmap, the user terminal may feed back ACK/NACK in response to the DL signals of CCs #1, #2 and #4 using existing PUCCH format 3 (fallback operation). The case where the user terminal cannot detect DCI including a bitmap may be, for example, when the DCI of a CC with an SCell index of 5 or greater cannot be detected, or may be when CCs with an SCell index of 5 or greater are not scheduled. For example, when the user terminal cannot detect the PDCCH/EPDCCH of CC #5, but can detect the PDCCHs/EPDCCHs of CCs #1, #2 and #4, the user terminal feeds back the ACK/NACK bit sequence for CCs #0 to #2 and #4 in PUCCH format 3. In this case, the user terminal may decide the codebook size of HARQ-ACKs to feed back based on the number of CCs detected by the user terminal, or based on a predetermined number of CCs (for example, five CCs).

In this way, by including a bitmap that shows scheduling-target cells in the DCIs of SCells having a predetermined cell index (for example, cell index 5) or more, it is possible to reduce the control information overhead of DCI for scheduling the PDSCHs of SCells. Also, even when CA to use 6 or more CCs is configured, since the base station limits scheduling to the PCell and the SCells of CCs #1, #2 and #4, the ACK/NACKs from the UE can be transmitted in PUCCH format 3, so that ACK/NACK can be multiplexed on the same PRBs as in ACK/NACK transmission by conventional UEs (for example Rel. 10 to 12), in which only five or fewer CCs can be configured, and therefore it becomes possible to suppress the PUCCH overhead, dynamically, in accordance with traffic conditions.

Here, although FIG. 3C shows a case where a fallback is provided by PUCCH format 3, if the PCell's PDCCH/EPDCCH alone is detected, a further fall back to use PUCCH format 1a/1b may be provided as well. That is, a two-step fallback may be provided.

It is also possible not to include bitmaps in DCI that is transmitted and received in the common search space (CSS), and, when DCI is detected only in the common search space, a fallback may be provided so that the user terminal transmits ACK/NACK in PUCCH format 1a/1b, which is a conventional scheme.

As described above, according to the first embodiment, since a bit map to show the CCs to be scheduled is included in DCI, it is possible to match the recognition of the codebook size between the radio base station and the user terminal. This makes it possible to suppress the deterioration of communication quality. Further, by using a bitmap, it is possible to judge whether or not a specific CC is a scheduling target. As a result, even when the user terminal cannot receive DCI in a scheduling-target CC, the user terminal can still judge that the ACK/NACK for this CC is a NACK.

Second Embodiment

A case will be described with the second embodiment where information about the cells to be scheduled is transmitted from the radio base station to the user terminal in the form of TDAI (Total Downlink Assignment Index), which is information that indicates the number of CCs that are scheduled (cells). Note that TDAI may be simply referred to as "DAI." Although, in the following embodiments, information will be transmitted using DAI (Downlink Assignment Index), this is by no means limiting, and other signals can be used as well.

First Example

Figure 4A:
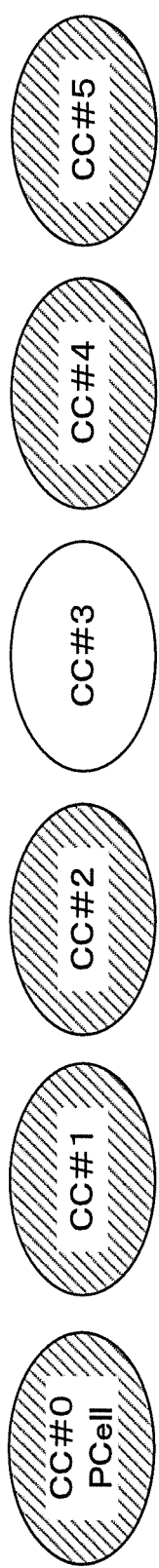
FIGS. 4A, 4B, and 4C are diagrams illustrating the status of scheduling in each CC according to the first example of a second embodiment, and the information contained in the DCI transmitted in each CC.

A first example of the second embodiment will be described with reference to FIGS. 4A, 4 B, and 4 C. FIGS. 4A, 4B, and 4C are diagrams showing the status of scheduling (DL signal transmission) in each CC and the TDAI information included in DCI in a given subframe.

In the first example, the radio base station includes a TDAI to indicate the number of CCs to be scheduled, in DCI that is transmitted in all the CCs that are scheduled.

For example, in FIG. 4A, CCs #0 to #2, #4 and #5 are the CCs to be scheduled, and CC #3 is not a scheduling-target CC. In this case, five CCs are scheduled, which is represented as TDAI=5, and the radio base station transmits DCI including the TDAI to the user terminal via the scheduling-target CCs (CCs #0 to #2, #4 and #5).

Figure 4B:
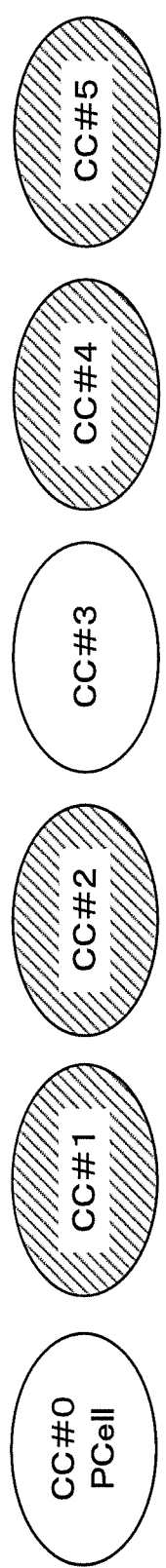

Also, in FIG. 4B, the CCs #1, #2, #4, and #5 are the CCs to be scheduled, and the CCs that are not subject to scheduling are CC #0 and CC #3. This case can be represented as TDAI=4, and the radio base station transmits DCI including the TDAI to the user terminal via the scheduling-target CCs (CCs #1, #2, #4 and #5).

The user terminal determines the codebook size of ACK/NACK based on the number indicated by the TDAI included in DCI. For example, in FIG. 4A, since TDAI=5 is provided, the user terminal determines that the number of CCs that are scheduled is 5, and determines the codebook size based on the number of transport blocks (or code words) and so on.

In this way, the user terminal can determine the codebook size of HARQ-ACKs based on the number of scheduled CCs obtained from the TDAI, regardless of the total number of PDCCHs/EPDCCHs actually detected.

In addition, the user terminal determines whether or not data transmitted from the radio base station has been received successfully, based on the decoding results of DL signals (for example, the PDSCH) received. When the number indicated by the TDAI matches the total number of PDCCHs/EPDCCHs actually detected, the user terminal generates ACK/NACK based on the PDSCH decoding results, and transmits the ACK/NACK bit sequence determined based on the TDAI to the radio base station.

On the other hand, if the number indicated by the TDAI does not match the total number of PDCCHs/EPDCCHs actually detected, the TDAI does not include information other than the number of scheduled cells. For this reason, the user terminal cannot determine in which CC the detection failure/error detection has occurred. Therefore, the user terminal transmits (feedbacks) a number of NACKs to match the value indicated by the TDAI to the radio base station as ACK/NACK.

Figure 4C:
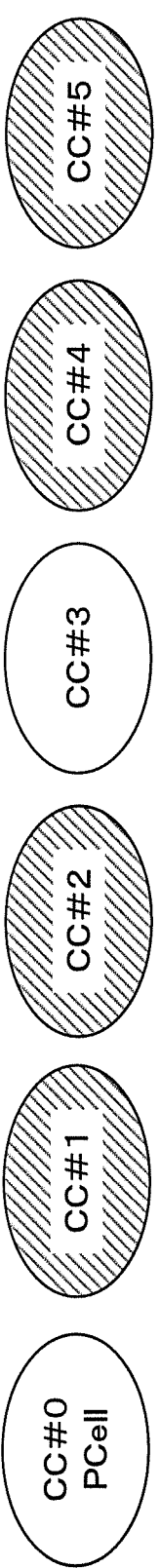

For example, in the case shown in FIG. 4C, the user terminal receives the DCIs (PDCCHs/EPDCCHs) of three CCs (CCs #1, #4, and #5) despite TDAI=4. In this case, the user terminal cannot determine in which CC the detection failure or error detection has occurred, and therefore the user terminal transmits a number of NACKs to match the number of CCs indicated by the TDAI (that is, four CCs), as ACK/NACK, to the radio base station. In this way, it is possible to match the recognition of the codebook size between the user terminal and the radio base station.

Second Example

Figure 5A:
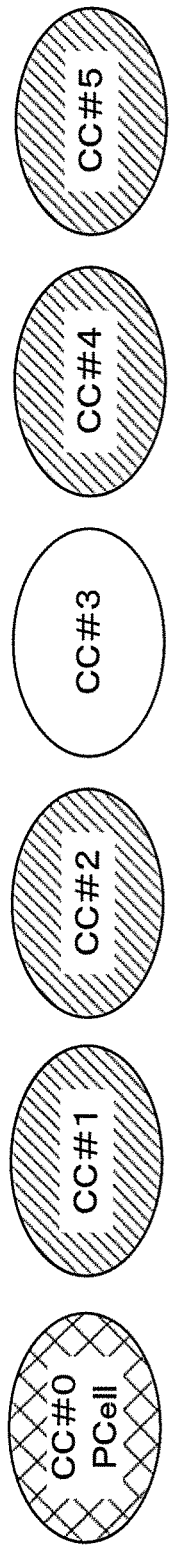
FIGS. 5A, 5B, and 5C are diagrams illustrating the status of scheduling in each CC according to a second example of the second embodiment, and the information contained in the DCI transmitted in each CC.

A second example of the second embodiment will be described with reference to FIGS. 5A, 5 B, and 5 C. FIGS. 5A, 5B and 5C are diagrams showing the status of scheduling (DL signal transmission) in each CC and the TDAI information included in DCI in a given subframe.

In the second example, the radio base station includes a TDAI to indicate the number of CCs to be scheduled in DCI transmitted in predetermined CCs (predetermined cells) among the CCs that are scheduled. That is, even among the CCs to be scheduled, there are CCs in which the DCI does not include a bitmap.

For example, in FIG. 5A, CCs #0 to #2, #4, and #5 are the CCs to be scheduled, but the case is shown in which no TDAI is included in the DCI of CC #0, which is the PCell. That is, the radio base station transmits DCI including TDAI in predetermined CCs (scheduled SCells) apart from the PCell. In this case, it is possible to suppress an increase in the overhead of DCI in the PCell where communication concentrates during CA.

In FIG. 5A, when DCI including a TDAI is detected, as in the first example, the user terminal can judge the number of CCs scheduled, based on the TDAI, and determine the number of ACK/NACK bits to feed back. On the other hand, when DCI including a TDAI cannot be detected (for example, when only the DCI of the PCell is detected), the user terminal cannot judge whether or not SCells are scheduled, and therefore the user terminal may feed back ACK/NACK only in response to DL signals from the PCell, using existing PUCCH format 1a/1b (fallback operation). In this case, if the PDCCH/EPDCCH of the PCell cannot be detected either, the user terminal does not have to transmit ACK/NACK (DTX).

Figure 5B:
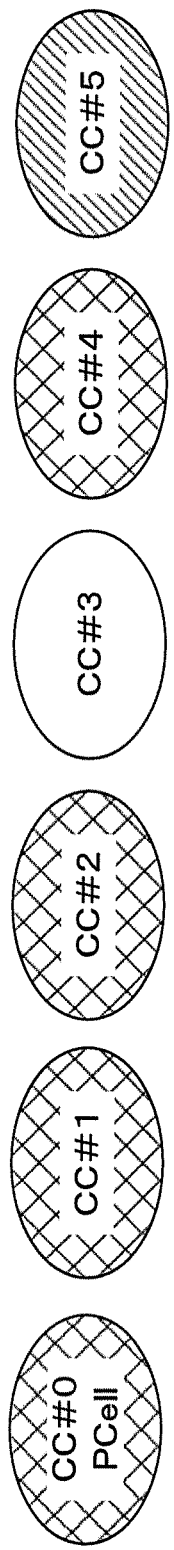

FIG. 5B shows a different mode of the second example. In FIG. 5B, although CCs #0 to #2, #4 and #5 are the CCs to be scheduled, the radio base station does not include a TDAI in the DCIs of CCs #0 to #2 and #4, and includes TDAI in the DCI of CC #5 and CCs beyond this (CCs having a cell index of 5 or more). When the user terminal detects the TDAI=5 in the DCI of CC #5, the user terminal can judge the number of scheduled CCs based on the detected TDAI, and determine the number of ACK/NACK bits to feed back.

In FIG. 5B, if the user terminal cannot detect DCI including a TDAI, the user terminal may feed back ACK/NACK in response to the DL signals of CCs #1, #2 and #4 using existing PUCCH format 3 (fallback operation). The case where the user terminal cannot detect DCI including a TDAI may be, for example, when the DCI of a CC with an SCell index of 5 or greater cannot be detected, or may be when CCs with an SCell index of 5 or greater are not scheduled. For example, when the user terminal cannot detect the PDCCH/EPDCCH of CC #5, but can detect the PDCCHs/EPDCCHs of CCs #1, #2 and #4, the user terminal feeds back the ACK/NACK bit sequence for CCs #0 to #2 and #4 in PUCCH format 3. In this case, the user terminal may decide the codebook size of HARQ-ACKs to feed back based on the number of CCs detected by the user terminal, or based on a predetermined number of CCs (for example, five CCs).

In this way, by including information (TDAI) that shows the number of scheduling-target cells in the DCIs of SCells having a predetermined cell index (for example, cell index 5) or more, it is possible to reduce the control information overhead of DCI for scheduling the PDSCHs of SCells. Also, even when CA to use 6 or more CCs is configured, since the base station limits scheduling to the PCell and the SCells of CCs #1, #2 and #4, the ACK/NACKs from the UE can be transmitted in PUCCH format 3, so that ACK/NACK can be multiplexed on the same PRBs as in ACK/NACK transmission by conventional UEs (for example Rel. 10 to 12), in which only five or fewer CCs can be configured, and therefore it becomes possible to suppress the PUCCH overhead, dynamically, in accordance with traffic conditions.

Figure 5C:
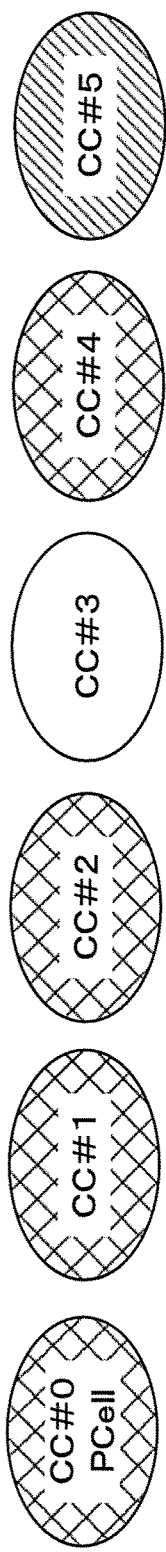

Here, although FIG. 5C shows a case where a fallback is provided by PUCCH format 3, if the PCell's PDCCH/EPDCCH alone is detected, a further fall back to use PUCCH format 1a/1b may be provided as well. That is, a two-step fallback may be provided.

It is also possible not to include a TDAI in DCI that is transmitted and received in the common search space (CSS), and, if DCI is detected only in the common search space, a fallback may be provided so that the user terminal transmits ACK/NACK in PUCCH format 1a/1b, which is a conventional scheme.

As described above, according to the first embodiment, since a TDAI to show the number of CCs to be scheduled is included in DCI, it is possible to match the recognition of the codebook size between the radio base station and the user terminal. This makes it possible to suppress the deterioration of communication quality. In addition, since TDAI is used, the number of CCs scheduled with a small amount of information can be reported with a small amount of information, so that it is possible to suppress deterioration in communication quality.

Third Embodiment

A case will be described with a third embodiment where information (for example, ADAI (Accumulated DAI)) to indicate the cumulative number of scheduled CCs is transmitted from the radio base station to the user terminal as information about the cells to be scheduled. In this case, a T/A DAI (Total/Accumulated DAI) scheme, in which an ADAI to indicate the cumulative number of scheduled CCs is transmitted, in addition to a TDAI that indicates the number of CCs scheduled, which has been described in the second embodiment, can be used.

First Example

Figure 6A:
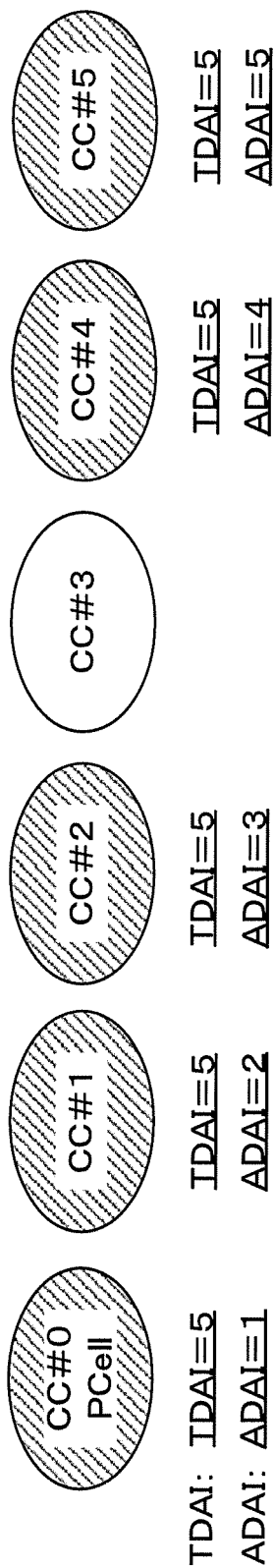
FIGS. 6A, 6B, and 6C are diagrams illustrating the status of scheduling in each CC according to the first example of a third embodiment, and the information contained in the DCI transmitted in each CC.

A first example of the third embodiment will be described with reference to FIGS. 6A, 6 B, and 6 C. FIGS. 6A, 6B, and 6C are diagrams showing the status of scheduling (DL signal transmission) in each CC and the information (TDAI and ADAI) included in DCI in a given subframe.

In the first example, the radio base station includes a TDAI, which is information that shows the number of CCs to be scheduled, and includes an ADAI, which is information related to the cumulative number of CCs, in DCI that is transmitted in all the CCs that are scheduled. Here, the cumulative number refers to the non-overlapping consecutive values that are configured in the scheduling-target cells in association with the cell indices. Therefore, while the TDAI is configured in the same value in each scheduled CC's DCI, the TDAI is configured in a different value in each scheduled CC's DCI.

For example, in FIG. 6A, CCs #0 to #2, #4 and #5 are the CCs to be scheduled, and CC #3 is not a scheduling-target CC. In this case, TDAI=5 is transmitted to all the CCs (CCs #0 to #2, #4 and #5) to be scheduled. Further, ADAIs to indicate the cumulative number of cells is transmitted to the CCs (CCs #0 to #2, #4 and #5) to be scheduled. In the example shown in FIG. 6A, the ADAI values are configured in order from the CC with the smallest cell index, out of the scheduled CCs.

For example, ADAI=1 is configured in CC #0, ADAI=2 is configured in CC #1, ADAI=3 is configured in CC #2, ADAI=4 is configured in CC #4, and ADAI=5 is configured in CC #5. In this way, DCIs including a TDAI and an ADAI, configured thus, is transmitted from the radio base station to the user terminal via the CCs (CCs #0 to #2, #4 and #5) to be scheduled.

Figure 6B:
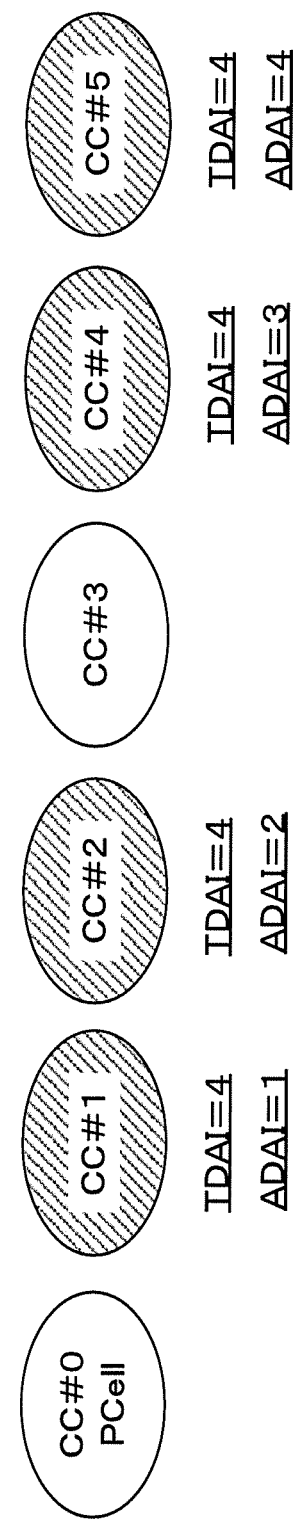
Figure 6C:
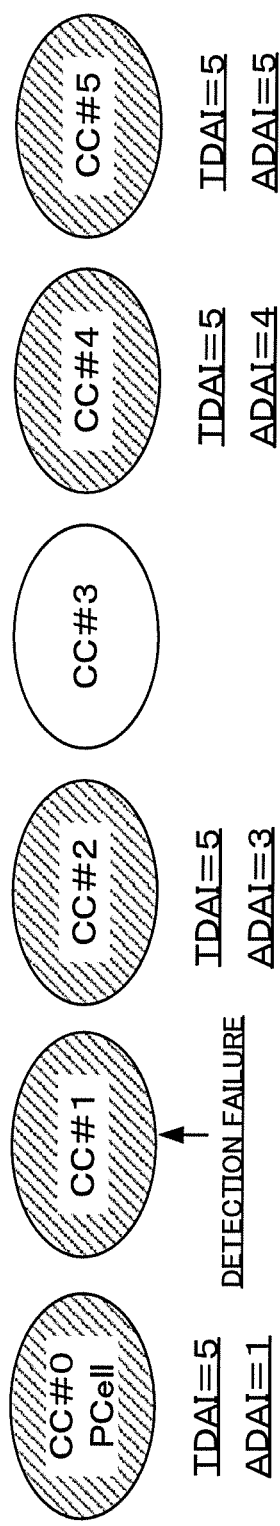

In FIG. 6B, CCs #1, #2, #4, and #5 are the CCs to be scheduled, so TDAI=4 is configured for the CCs to be scheduled. Also, as in FIG. 6A, different ADAI values are configured for each CC, and DCIs including a TDAI and an ADAI are transmitted from the radio base station to the user terminal via the scheduling-target CCs (CCs #1, #2, #4 and #5).

The user terminal can determine the codebook size of HARQ-ACKs based on the received TDAIs. Also, the user terminal can determine the ACK/NACK to correspond to the CCs based on the received ADAIs and the PDSCH decoding results.

In the first example, if the ADAIs detected by the user terminal do not provide consecutive values and there is a missing ADAI, this makes it clear that a PDCCH/EPDCCH detection failure has occurred in the CC where the ADAI is missing. For example, in FIG. 6C, since ADAI=2 to correspond to CC #1 is missing, it is clear that a detection failure has occurred in this portion. Therefore, the user terminal transmits a NACK as the ACK/NACK to correspond to this CC (CC #1 in FIG. 6C).

Also, if the maximum ADAI value does not match the TDAI value, it necessarily follows that the user terminal has failed to detect the DCI of one or more CCs with a large cell index. In this case, the user terminal may transmit a NACK as the ACK/NACK to correspond to this CC. For example, if the TDAI received by the user terminal is 5 and the maximum ADAI received is 4 (the case of failing to detect CC #5 in FIG. 6A), it is clear that the user terminal has failed to detect the CC of ADAI=5. In this case, a NACK may be transmitted as the ACK/NACK for this CC.

As described above, according to the first example of the third embodiment, the DCI transmitted in each CC includes an ADAI and a TDAI, so that the user terminal can know in which a detection failure has occurred, based on the ADAIs and the TDAIs. Therefore, the user terminal can appropriately configure the codebook size of ACK/NACK to feed back based on the number of CCs that are scheduled, and can appropriately identify the CC when a detection failure occurs. Thus, even when the user terminal finds out that a detection failure has occurred, the user terminal does not have to transmit NACKs alone as ACK/NACK to the radio base station, so that it is possible to prevent unnecessary retransmission by the radio base station, and achieve improved throughput.

Second Example

Figure 7A:
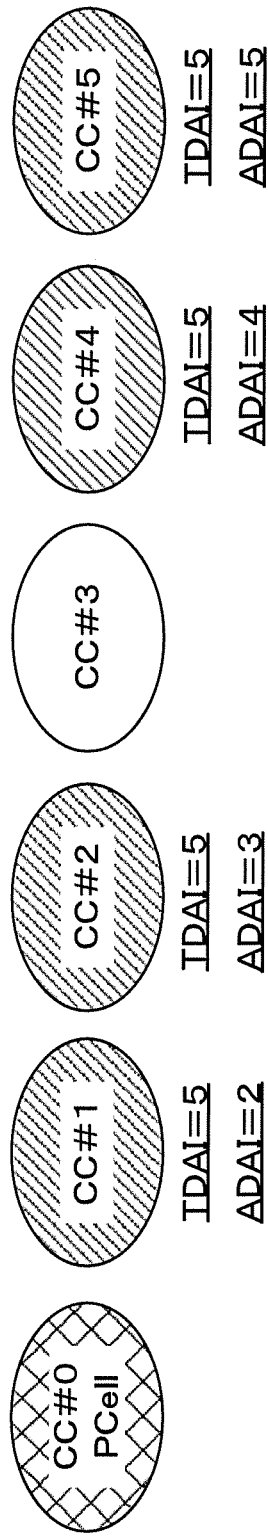
FIGS. 7A, 7B, and 7C are diagrams illustrating the status of scheduling in each CC according to a second example of the third embodiment, and the information contained in the DCI transmitted in each CC.

A second example of the third embodiment will be described with reference to FIGS. 7A, 7 B, and 7 C. FIGS. 7A, 7B, and 7C are diagrams showing the status of scheduling (DL signal transmission) in each CC in a given subframe, and the TDAI information and the ADAI information included in DCI.

In the second example, the radio base station includes a TDAI, which shows the number of CCs to be scheduled, and an ADAI, which shows the cumulative number of CCs, in DCI that is transmitted in predetermined CCs (predetermined cells) among the CCs that are scheduled. That is, even among the CCs to be scheduled, there are CCs in which the DCI does not include a TDAI and an ADAI.

For example, FIG. 7A shows a case where CCs #0 to #2, #4, and #5 are the CCs to be scheduled, but the DCI of CC #0, which is the PCell, does not include a TDAI or an ADAI. That is, the radio base station transmits DCIs including a TDAI and an ADAI in predetermined CCs (scheduling SCells) apart from the PCell. In this case, it is possible to suppress an increase in the overhead of DCI in the PCell where communication concentrates during CA.

In FIG. 7A, when DCI including a TDAI and an ADAI is detected, the user terminal can judge the number of CCs scheduled, based on the TDAI and the ADAI, as in the first example, and determine the number of ACK/NACK bits to feed back. On the other hand, if DCI including a TDAI and an ADAI cannot be detected (for example, when only the DCI of the PCell is detected), the user terminal cannot judge whether or not SCells are scheduled, and therefore the user terminal may feed back ACK/NACK only in response to DL signals from the PCell, using existing PUCCH format 1a/1b (fallback operation). In this case, if the PDCCH/EPDCCH of the PCell cannot be detected either, the user terminal does not have to transmit ACK/NACK (DTX).

Figure 7B:
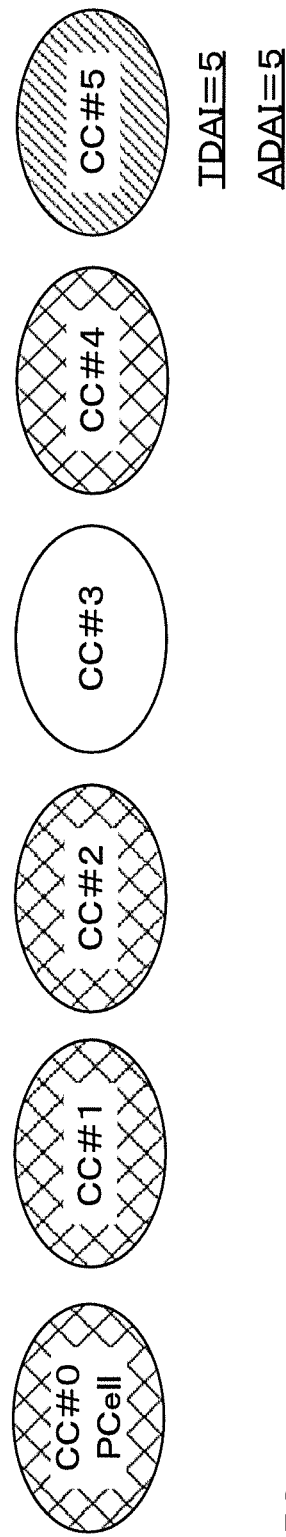

FIG. 7B shows a different mode of the second example. In FIG. 7B, although CCs #0 to #2, #4 and #5 are the CCs to be scheduled, the radio base station does not include a TDAI or an ADAI in the DCIs of CCs #0 to #2 and #4, and includes a TDAI and an ADAI in the DCIs of CC #5 and CCs beyond this (CCs having a cell index of 5 or more). When the user terminal detects the TDAI=5 and ADAI=5 in the DCI of CC #5, the user terminal can judge the number of scheduled CCs based on the detected TDAI and/or ADAI, and determine the number of ACK/NACK bits to feed back.

In FIG. 7B, if the user terminal cannot detect DCI including a TDAI and an ADAI, the user terminal may feed back ACK/NACK in response to the DL signals of CCs #1, #2 and #4 using existing PUCCH format 3 (fallback operation). The case where the user terminal cannot detect DCI including a TDAI and an ADAI may be, for example, when the DCI of a CC with an SCell index of 5 or greater cannot be detected, or may be when CCs with an SCell index of 5 or greater are not scheduled. For example, when the user terminal cannot detect the PDCCH/EPDCCH of CC #5, but can detect the PDCCHs/EPDCCHs of CCs #1, #2 and #4, the user terminal feeds back the ACK/NACK bit sequence for CCs #0 to #2 and #4 in PUCCH format 3. In this case, the user terminal may decide the codebook size of HARQ-ACKs to feed back based on the number of CCs detected by the user terminal, or based on a predetermined number of CCs (for example, five CCs).

In this way, by including information (TDAI and ADAI) that shows the number and/or the cumulative number of scheduling-target cells in the DCIs of SCells having a predetermined cell index (for example, cell index 5) or more, it is possible to reduce the control information overhead of DCI for scheduling the PDSCHs of SCells. Also, even when CA to use 6 or more CCs is configured, since the base station limits scheduling to the PCell and the SCells of CCs #1, #2 and #4, the ACK/NACKs from the UE can be transmitted in PUCCH format 3, so that ACK/NACK can be multiplexed on the same PRBs as in ACK/NACK transmission by conventional UEs (for example Rel. 10 to 12), in which only five or fewer CCs can be configured, and therefore it becomes possible to suppress the PUCCH overhead, dynamically, in accordance with traffic conditions.

Figure 7C:
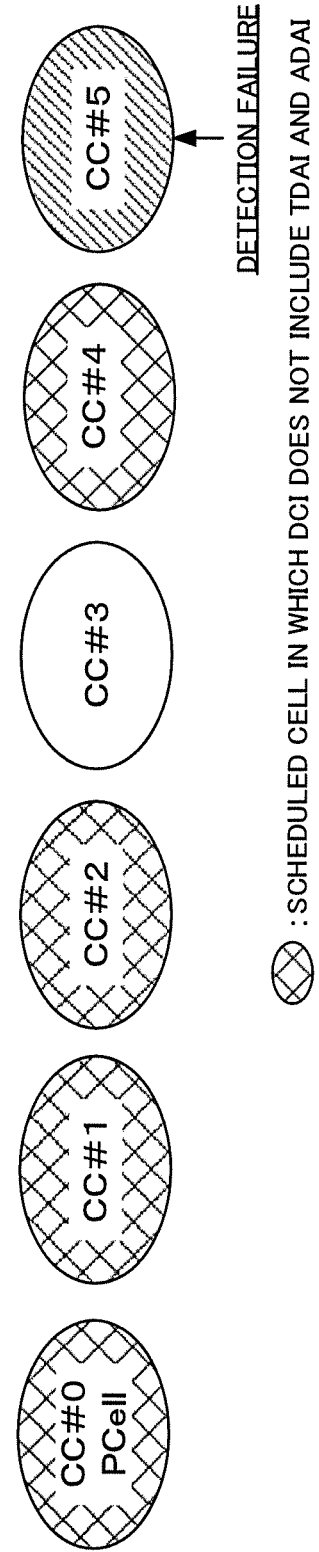

Here, although FIG. 7C shows a case where a fallback is provided by PUCCH format 3, if the PCell's PDCCH/EPDCCH alone is detected, a further fall back to use PUCCH format 1a/1b may be provided as well. That is, a two-step fallback may be provided.

It is also possible not to include a TDAI and an ADAI in DCI that is transmitted and received in the common search space (CSS), and, if DCI is detected only in the common search space, a fallback may be provided so that the user terminal transmits ACK/NACK in PUCCH format 1a/1b, which is a conventional scheme.

As described above, according to the first embodiment, since a TDAI to show the number of CCs to be scheduled and an ADAI to show the cumulative number of CCs to be scheduled are included in DCI, it is possible to match the recognition of the codebook size between the radio base station and the user terminal. This makes it possible to suppress the deterioration of communication quality. Further, by using TDAIs and ADAIs, it is possible to judge whether or not a specific CC is a scheduling target. By this means, even when the user terminal cannot receive DCI in a scheduling-target CC, the user terminal can still judge that the ACK/NACK for this CC is a NACK.

In the above-described embodiment, ADAIs and CC cell indices are associated in ascending order, but the method of correlating ADAI values is not limited to this. For example, ADAIs and cell indices may be associated in descending order. In this case, for example, a TDAI value is associated with the smallest cell index CC. Even in this case, as described above, the user terminal can detect a CC where a detection failure has occurred.

Fourth Embodiment

A case will be described with a fourth embodiment where information (for example, LDI (Last Downlink Assignment Index, Last Downlink grant Indicator)) for identifying the cell having the largest cell index is transmitted from the radio base station to the user terminal as information about scheduling-target cells. In this case, an A DAI/LDI (Accumulated DAI/LDI) scheme, in which an LDI to indicate the cell with the largest cell index is transmitted, in addition to an ADAI that indicates the cumulative number of CCs, which has been described in the third embodiment, can be used.

First Example

A first example of the fourth embodiment will be described with reference to FIG. 8A, FIG. 8B, and FIG. 8C. FIGS. 8A, 8B, and 8C are diagrams showing the status of scheduling (DL signal transmission) in each CC and the information (LDI and ADAI) included in DCI in a given subframe.

In the first example, the radio base station includes an ADAI, which is information related to the cumulative number of CCs, and an LDI for identifying the cell with the largest CC index (cell index), in DCI that is transmitted in all the CCs that are scheduled. Here, the LDI may be composed of, for example, one bit. Further, among the cells to be scheduled, the cell with the largest cell index may be indicated with LDI=1, and the other cells may be indicated with LDI=0.

For example, in FIG. 8A, CCs #0 to #2, #4, and #5 are the CCs to be scheduled, and CC #3 is not a scheduling-target CC. In this case, in CCs #0 to #2 and #4, DCI including LDI=0 and ADAIs corresponding to each CC is transmitted to the user terminal. Further, in CC #5 having the largest cell index, DCI including LDI=1 and ADAI=5 is transmitted to the user terminal. In the example shown in FIG. 8A, the ADAI values are configured in order from the smallest cell index. In this way, DCIs including an LDI and an ADAI, configured thus, is transmitted from the radio base station to the user terminal via the CCs (CCs #0 to #2, #4 and #5) to be scheduled.

In FIG. 8B, since CCs #1, #2, #4 and #5 are the CCs to be scheduled, LDI=1 is associated with CC #5, and DCIs including an ADAI and an LDI are transmitted to the user terminal via the CCs to be scheduled (CCs #1, #2, #4, and #5).

The user terminal can determine the codebook size based on the received LDIs and AIDIs. To be more specific, the user terminal can configure the ADAI value in the CC where LDI=1 the codebook size. Also, the user terminal can determine the ACK/NACK to correspond to the CCs based on the received ADAIs and the PDSCH decoding results. Furthermore, if the ADAIs do not provide consecutive values and there is a missing ADAI, this makes it clear that a detection failure has occurred in the CC where the ADAI is missing. In this case, the user terminal determines that the ACK/NACK for this CC is a NACK, generates a NACK, and transmits this to the radio base station.

If the user terminal fails reception with respect to the CC with LDI=1, it is clear that the user terminal has failed to detect this CC. In this case, it is clear that the user terminal is unable to receive the PDCCH/EPDCCH of one or more CCs having a cell index that is larger than that of the CC with the largest cell index, out of the CCs where the user terminal has detected DL signals.

In this CC, the user terminal is unable to receive signals despite the fact that this is a CC scheduled by the radio base station. Here, since the detection failure rate of the PDCCH/EPDCCH is 0.1%, the possibility of failing detection twice or more in a row is very low, and occurrence of failure can be ignored. Therefore, even if the user terminal fails to receive a CC with LDI=1, the user terminal can operate assuming that the user terminal has failed to detect only one CC with LDI=1.

Therefore, the user terminal may generate a NACK for the CC indicating LDI=1 where the user terminal has failed reception, and generate ACK/NACK based on the PDSCH decoding results and the reception results of ADAIs, and transmit the generated ACK/NACK to the radio base station.

For example, FIG. 8C shows the case where the user terminal cannot detect CC #5 having the largest cell index among the scheduled cells. In this case, since CC #4 has LDI=0 and CC #5 is the only CC having a CC index larger than that of CC #4, the user terminal can judge that CC #5 is has LDI=1. Also, at this time, since the ADAI in CC #4 is 4, the user terminal can judge that the ADAI in CC #5 is 5. Therefore, in this case, the user terminal can determine the ACK/NACK codebook size based on the values of the LDI (LDI=1) and the ADAI (ADAI=5) in CC #5, and control ACK/NACK feedback.

As described above, according to the first example of the fourth embodiment, it is possible to identify the CC having the largest CC index, among the CCs that are scheduled, based on a small amount of information (for example, 1 bit). By this means, it is possible to suppress an increase in overhead of the DCI. Further, since the user terminal can appropriately judge the size of ACK/NACK based on LDIs and ADAIs, it is possible to suppress the deterioration of the quality of communication.

Second Example

Figure 9A:
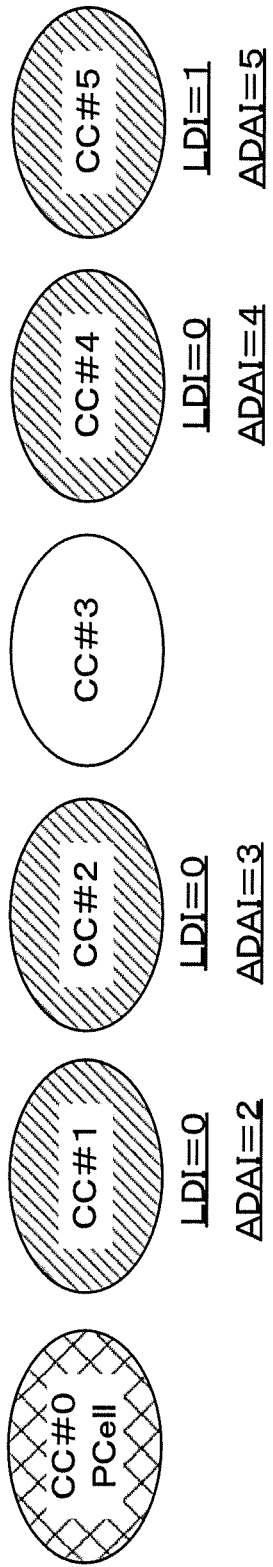
FIGS. 9A, 9B, and 9C are diagrams illustrating the status of scheduling in each CC according to a second example of the fourth embodiment, and the information contained in the DCI transmitted in each CC.

A second example of the fourth embodiment will be described with reference to FIGS. 9A, 9 B, and 9 C. FIG. 9A, FIG. 9B, and FIG. 9C are diagrams showing the status of scheduling (DL signal transmission) in each CC, and the LDI information and the ADAI information included in DCI, in a given subframe.

In the second example, the radio base station includes an LDI, which is information for identifying the cell with the largest cell index, and an ADAI, which shows the cumulative number of CCs, in DCI that is transmitted in predetermined CCs (predetermined cells) among the CCs that are scheduled. That is, even among the CCs to be scheduled, there are CCs in which the DCI does not include an LDI or an ADAI.

For example, FIG. 9A shows a case where CCs #0 to #2, #4, and #5 are the CCs to be scheduled, but the DCI of CC #0, which is the PCell, does not include an LDI or an ADAI. That is, the radio base station transmits DCIs including an LDI and an ADAI in predetermined CCs (scheduling SCells) apart from the PCell. In this case, it is possible to suppress an increase in the overhead of DCI in the PCell where communication concentrates during CA.

In FIG. 9A, when DCI including a an LDI and an ADAI is detected, the user terminal can judge the number of CCs scheduled, based on the LDI and the ADAI, as in the first example, and determine the number of ACK/NACK bits to feed back. In FIG. 9A, in CC #5 where LDI=1, the DCI includes an LDI and an ADAI. Therefore, the user terminal can judge the number of CCs that are scheduled, based on the LDI and the ADAI. In this way, by including the CC having the largest cell index among the CCs with LDI=1 (that is, the scheduled CCs), in predetermined CCs, the user terminal can judge the number of CCs that are scheduled, based on LDIs and ADAIs included in DCI.

On the other hand, if DCI including an LDI and an ADAI cannot be detected (for example, when only the DCI of the PCell is detected), the user terminal cannot judge whether or not SCells are scheduled, and therefore the user terminal may feed back ACK/NACK only in response to DL signals from the PCell, using existing PUCCH format 1a/1b (fallback operation). In this case, if the PDCCH/EPDCCH of the PCell cannot be detected either, the user terminal does not have to transmit ACK/NACK (DTX).

Figure 9B:
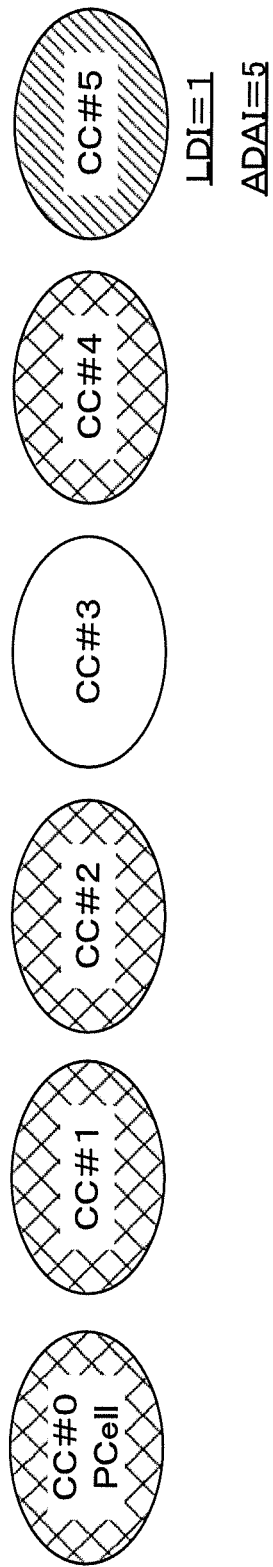

FIG. 9B shows a different mode of the second example. In FIG. 9B, although CCs #0 to #2, #4 and #5 are the CCs to be scheduled, the radio base station does not include an LDI or an ADAI in the DCIs of CCs #0 to #2 and #4, and includes an LDI and an ADAI in the DCIS of CC #5 and CCs beyond this (CCs having a cell index of 5 or more). When the user terminal detects LDI=5 and ADAI=5 in the DCI of CC #5, the user terminal can judge the number of scheduled CCs based on the value of the ADAI in the detected CC with LDI=1, and determine the number of ACK/NACK bits to feed back.

In FIG. 9B, if the user terminal cannot detect DCI including a an LDI and an ADAI, the user terminal may feed back ACK/NACK in response to the DL signals of CCs #1, #2 and #4 using existing PUCCH format 3 (fallback operation). The case where the user terminal cannot detect DCI including an LDI and an ADAI may be, for example, when the DCI of a CC with an SCell index of 5 or greater cannot be detected, or may be when CCs with an SCell index of 5 or greater are not scheduled. For example, when the user terminal cannot detect the PDCCH/EPDCCH of CC #5, but can detect the PDCCHs/EPDCCHs of CCs #1, #2 and #4, the user terminal feeds back the ACK/NACK bit sequence for CCs #0 to #2 and #4 in PUCCH format 3. In this case, the user terminal may decide the codebook size of HARQ-ACKs to feed back based on the number of CCs detected by the user terminal, or based on a predetermined number of CCs (for example, five CCs).

In this way, by including information (LDI and ADAI) that shows the cumulative number of scheduling-target cells and/or that identifies the cell with the largest cell index) in the DCIs of SCells having a predetermined cell index (for example, cell index 5) or more, it is possible to reduce the control information overhead of DCI for scheduling the PDSCHs of SCells. Also, even when CA to use 6 or more CCs is configured, since the base station limits scheduling to the PCell and the SCells of CCs #1, #2 and #4, the ACK/NACKs from the UE can be transmitted in PUCCH format 3, so that ACK/NACK can be multiplexed on the same PRBs as in ACK/NACK transmission by conventional UEs (for example Rel. 10 to 12), in which only five or fewer CCs can be configured, and therefore it becomes possible to suppress the PUCCH overhead, dynamically, in accordance with traffic conditions.

Figure 9C:
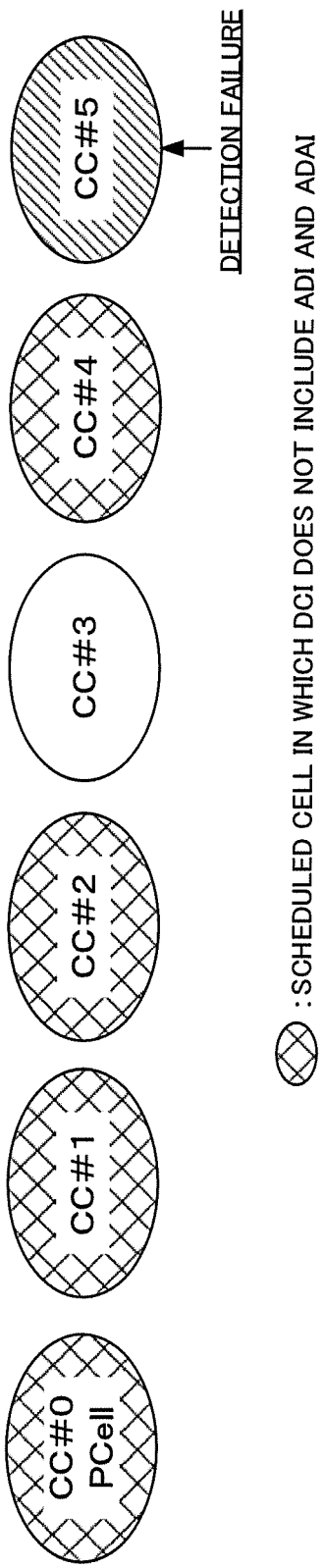

Here, although FIG. 9C shows a case where a fallback is provided by PUCCH format 3, if the PCell's PDCCH/EPDCCH alone is detected, a further fall back to use PUCCH format 1a/1b may be provided as well. That is, a two-step fallback may be provided.

It is also possible not to include an LDI and an ADAI in DCI that is transmitted and received in the common search space (CSS), and, if DCI is detected only in the common search space, a fallback may be provided so that the user terminal transmits ACK/NACK in PUCCH format 1a/1b, which is a conventional scheme.

As described above, according to the first embodiment, since an LDI, which is information for identifying the cell with the largest cell index, and an ADAI to show the cumulative number of CCs, are included in DCI, it is possible to match the recognition of the codebook size between the radio base station and the user terminal. This makes it possible to suppress the deterioration of communication quality. Further, by using LDIs and ADAIs, it is possible to judge whether or not a specific CC is a scheduling target. By this means, even when the user terminal cannot receive DCI in a scheduling-target CC, the user terminal can still judge that the ACK/NACK for this CC is a NACK.

(Variation)

Although cases have been shown with the above-described embodiments where the information about scheduling-target cells is included in bit maps or DAIs (including TDAI, ADAI and LDAI) in DCI, which is provided in physical layer signaling, these cases are by no means limiting. For example, information related to cells to be scheduled may be transmitted by using another bit field in DCI or by using a newly defined bit field. Alternatively, the information related to cells to be scheduled may be included in MAC layer signaling such as DL MAC CEs.

Furthermore, DCI formats and DL MAC CEs may be used in combination. For example, when bitmaps and DAIs are scheduled in a plurality of CCs, it is possible to schedule the bitmaps and DAIs in all or part of the MAC CEs, and schedule the rest in DCI (PDCCH/EPDCCH).

Also, although exemplary cases have been described with the above examples where the CC for receiving a predetermined PDSCH and the CC for receiving the PDCCH/EPDCCH that allocates this PDSCH are the same, the application of the present invention is not limited to this. For example, the method described in each embodiment can be applied even when the CC to receive a predetermined PDSCH and the CC to receive the PDCCH/EPDCCH that allocates this PDSCH are different (cross-carrier scheduling).

In addition, when various DAIs (TDAI, ADAI and LDAI) and bitmaps are included in the PDCCH/EPDCCHs of a plurality of CCs, the user terminal may detect multiple PDCCHs/EPDCCHs containing different DAIS and bitmaps. In such a case, there is a high possibility that some PDCCHs/EPDCCHs are erroneously detected.

Therefore, when a plurality of DAIs and/or bitmaps are obtained, the user terminal may select a TDAI (or an ADAI) and/or a bitmap based on any of the following methods, and determine the codebook size:

(1) choosing by majority rule (that is, selecting the most-often detected TDAI (or ADAI) and/or bitmap);

(2) selecting the one scheduled in the largest number of CCs (that is, selecting the largest TDAI (or ADAI) and/or the bit map with the large number of "1s"); and (3) selecting the one scheduled in the smallest number of CCs the TDAI (that is, selecting the smallest TDAI (or ADAI) and/or the bit map with the smallest number of "1s").

As described above, when varying bitmaps/DAI values are transmitted in each CC, the bitmaps/DAI values are determined based on predetermined rules, so that it is possible to reduce the possibility that the recognition of the number of ACK/NACK bits does not coincide between the radio base station and the user terminal.

(Radio Communication System)

Now, the structure of the radio communication system according to one or more embodiments will be described below. In this radio communication system, the radio communication methods according to embodiments disclosed herein are employed. Note that the radio communication methods of the above-described embodiments may be applied individually or may be applied in combination.

Figure 10:
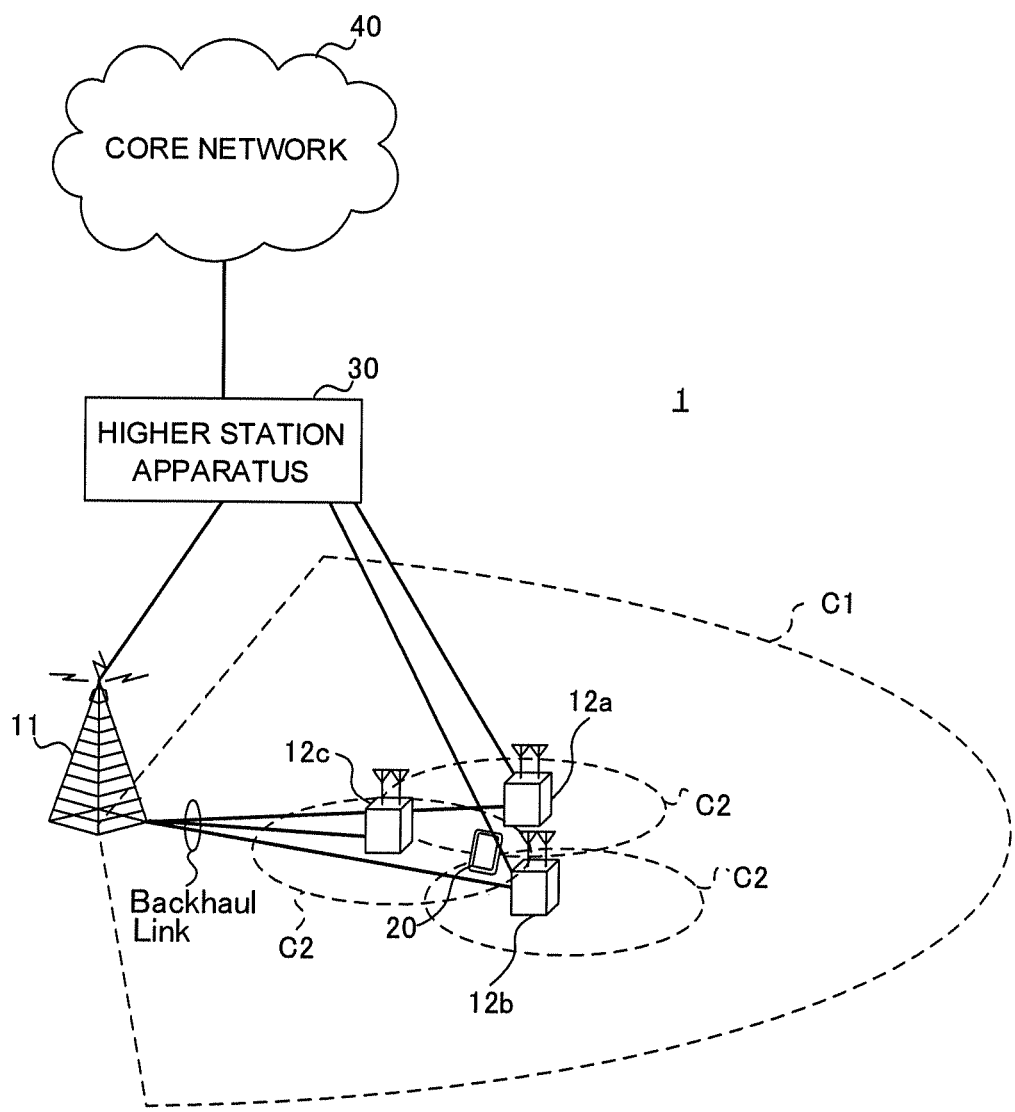
FIG. 10 is a diagram to show a schematic structure of a radio communication system in accordance with one or more embodiments disclosed herein.

FIG. 10 is a diagram to show an example of a schematic structure of a radio communication system in accordance with one or more embodiments disclosed herein. The radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-A" (LTE-Advanced), "IMT-Advanced," "4G," "5G," "FRA" (Future Radio Access) and so on.

The radio communication system 1 shown in FIG. 10 includes a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12 (12a to 12c). The user terminals 20 may use the macro cell C1 and the small cells C2, which use different frequencies, at the same time, by means of CA or DC. Also, the user terminals 20 can execute CA or DC by using a plurality of cells (CCs) (for example, six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the configuration of the frequency band for use in each radio base station is by no means limited to these.

A structure may be employed here in which wire connection (for example, means in compliance with the Common Public Radio Interface (CPRI) such as optical fiber, the X2 interface and so on) or wireless connection is established between the radio base station 11 and the radio base station 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (Home eNodeBs), "RRHs" (Remote Radio Heads), "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, Orthogonal Frequency Division Multiple Access (OFDMA) is applied to the downlink, and Single-Carrier Frequency Division Multiple Access (SC-FDMA) is applied to the uplink. OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols to use for the PDCCH is communicated by the PCFICH. HARQ delivery acknowledgement signals (ACK/NACK) in response to the PUSCH are communicated by the PHICH. The EPDCCH is frequency-division-multiplexed with the PDSCH (downlink shared data channel) and used to communicate DCI and so on, like the PDCCH.

Also, DCI may include a bit map that shows scheduled cells, a Total Downlink Assignment Index (TDAI) that shows the number of scheduled cells, an Accumulated DAI (ADAI) that represents information about the cumulative number of scheduled cells, an LDI (Last Downlink Assignment Index) that represents information about the cell having the largest cell index among the scheduled cells, and so on. For the PUSCH, a plurality of formats such as PUSCH format 1a/1b and PUSCH format 3 are configured for use for ACK/NACK.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), delivery acknowledgement signals and so on are communicated by the PUCCH. By means of the PRACH, random access preambles for establishing connections with cells are communicated.

<Radio Base Station>

Figure 11:
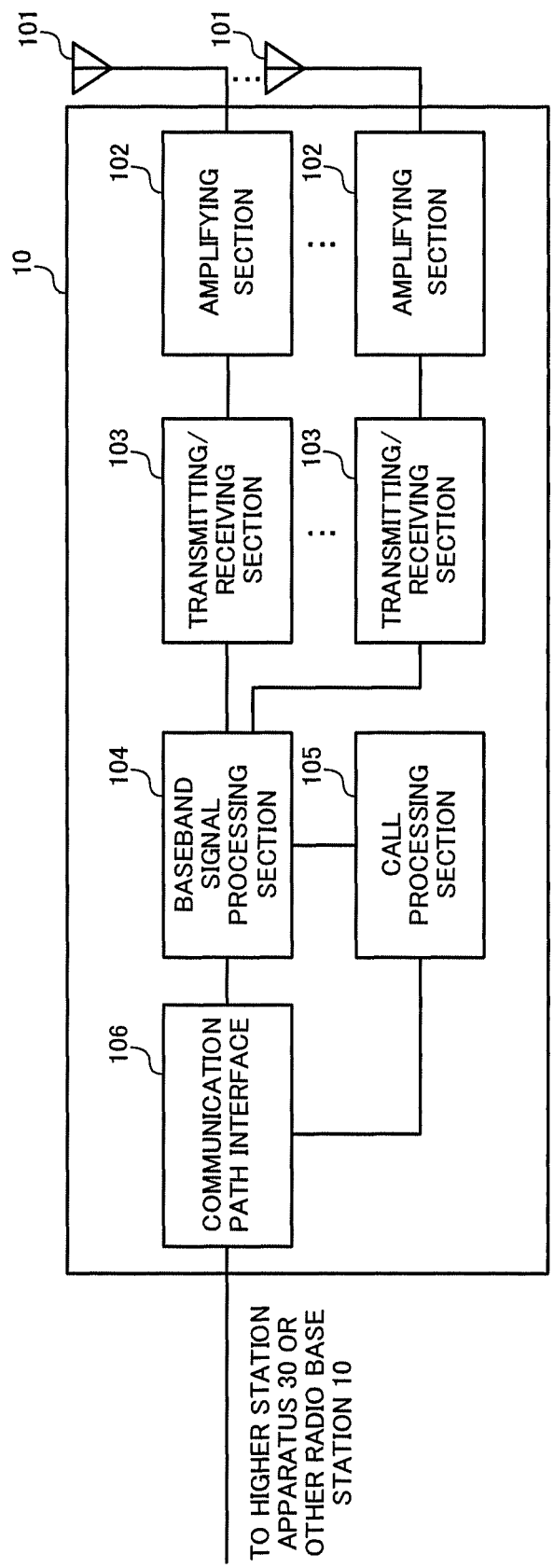
FIG. 11 is a diagram to show an example of an overall structure of a radio base station in accordance with one or more embodiments disclosed herein.

FIG. 11 is a diagram to show an example of an overall structure of a radio base station in accordance with one or more embodiments disclosed herein. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving devices that can be described based on common understanding of the technical field to which the present invention pertains. Note that a transmitting/receiving section 103 may be structured as a transmitting/receiving section in one entity, or may be constituted by a transmitting section and a receiving section. Further, transmitting/receiving sections 103 may constitute the transmission section and the receiving section according to one or more embodiments disclosed herein.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

Note that the transmitting/receiving sections 103 transmit uplink transmission power control information, generated by the transmission signal generation section 302 (described later), downlink signals including PHR configuration information and so on, to the user terminals 20.

The communication path interface section 106 transmits and receives signals to and from the higher station apparatus 30 via a predetermined interface. Also, the communication path interface 106 may transmit and/or receive signals (backhaul signaling) with other radio base stations 10 via an inter-base station interface (for example, an interface in compliance with the CPRI (Common Public Radio Interface), such as optical fiber, the X2 interface, etc.).

Figure 12:
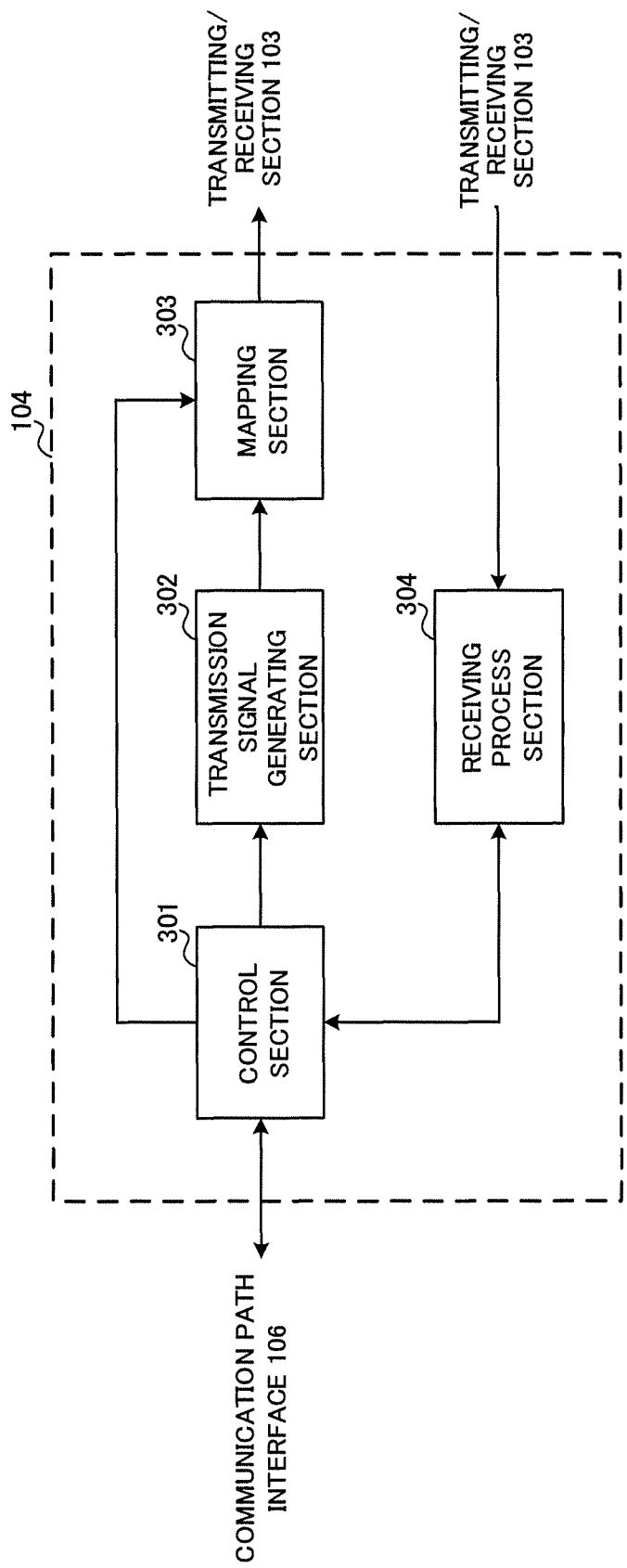
FIG. 12 is a diagram to show an example of a functional structure of a radio base station in accordance with one or more embodiments disclosed herein.

FIG. 12 is a diagram to show an example of a functional structure of a radio base station according to the present embodiment. Note that, although FIG. 12 primarily shows functional blocks that pertain to characteristic parts of the present embodiment, the radio base station 10 has other functional blocks that are necessary for radio communication as well. As shown in FIG. 12, the baseband signal processing section 104 has a control section (scheduler) 301, a transmission signal generating section 302, a mapping section 303 and a received signal processing section 304.

The control section (scheduler) 301 controls the whole of the radio base station 10. The control section 301 can be constituted by a controller, a control circuit or a control device that can be described based on common understanding of the technical field to which one or more embodiments of the present invention pertains. Furthermore, the control section 301 can constitute the control section according to one or more embodiments of the present invention.

The control section 301, for example, controls the generation of signals in the transmission signal generating section 302, the allocation of signals by the mapping section 303, and so on. Furthermore, the control section 301 controls the signal receiving processes in the received signal processing section 304, the measurements of signals, and so on.

The control section 301 controls the scheduling (for example, resource allocation) of downlink data signals that are transmitted in the PDSCH and downlink control signals that are communicated in the PDCCH and/or the EPDCCH. Also, the control section 301 controls the scheduling of synchronization signals, and downlink reference signals such as CRSs (Cell-specific Reference Signals), CSI-RSs (Channel State Information Reference Signals), DM-RSs (Demodulation Reference Signals) and so on.

Also, the control section 301 controls the scheduling of uplink data signals transmitted in the PUSCH, uplink control signals transmitted in the PUCCH and/or the PUSCH (for example, delivery acknowledgement signals (HARQ-ACKs)), random access preambles transmitted in the PRACH, uplink reference signals and so on. The control section 301 controls the transmission signal generating section 302 and the mapping section 303 to transmit uplink data to user terminals 20 connected with the radio base station 10.

Further, the control section 301 can control the transmission signal generation section 302 to transmit DCI to a user terminal in a single cell (CC) or in a plurality of cells. The control section 301 can include, in DCI, information about the cells being the target of scheduling. For example, the control section 301 can include a bitmap that indicates scheduled cells, in DCI (first example). The control section 301 can include a TDAI (Total Downlink Assignment Index) that indicates the number of scheduled cells, in DCI (second example). Further, in addition to a TDAI, the control section 301 can include an ADAI (Accumulated DAI), which indicates the cumulative number corresponding to the cell index of each cell, in DCI (above third example). Further, the control section 301 can include an LDI (Last Downlink Assignment Index), which identifies the cell with the largest cell index among the scheduled cells, in DCI (fourth example).

Note that the control section 301 may include information about the cells to be scheduled, in higher layer signaling.

The transmission signal generating section 302 generates downlink signals (downlink control signals, downlink data signals, downlink reference signals and so on) based on commands from the control section 301, and outputs these signals to the mapping section 303. The transmission signal generating section 302 can be constituted by a signal generator, a signal generating circuit or a signal generating device that can be described based on common understanding of the technical field to which one or more embodiments of the present invention pertains.

For example, the transmission signal generating section 302 generates DL assignments, which report downlink signal allocation information, and UL grants, which report uplink signal allocation information, based on commands from the control section 301. For example, the transmission signal generating section 302 generates DCI, including information about the cells to be scheduled, following commands from the control section 301.

Also, the downlink data signals are subjected to a coding process and a modulation process, based on coding rates and modulation schemes that are selected based on channel state information (CSI) from each user terminal 20 and so on.

The mapping section 303 maps the downlink signals generated in the transmission signal generating section 302 to predetermined radio resources based on commands from the control section 301, and outputs these to the transmitting/receiving sections 103. The mapping section 303 can be constituted by a mapper, a mapping circuit or a mapping device that can be described based on common understanding of the technical field to which one or more embodiments of the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or a signal processing device that can be described based on common understanding of the technical field to which one or more embodiments of the present invention pertains can be used.

The received signal processing section 304 outputs the decoded information acquired through the receiving processes to the control section 301. The received signal processing section 304 is able to perform measurements on the received signal. The received signal processing section 304 can be constituted by a measurer, a measurement circuit or a measurement device that can be described based on common understanding of the technical field to which one or more embodiments of the present invention pertains.

Also, the received signal processing section 304 may measure the received power (for example, RSRP (Reference Signal Received Power)), the received quality (for example, RSRQ (Reference Signal Received Quality)), channel states and so on, with respect to the received signals. The measurement results may be output to the control section 301.

<User Terminal>

Figure 13:
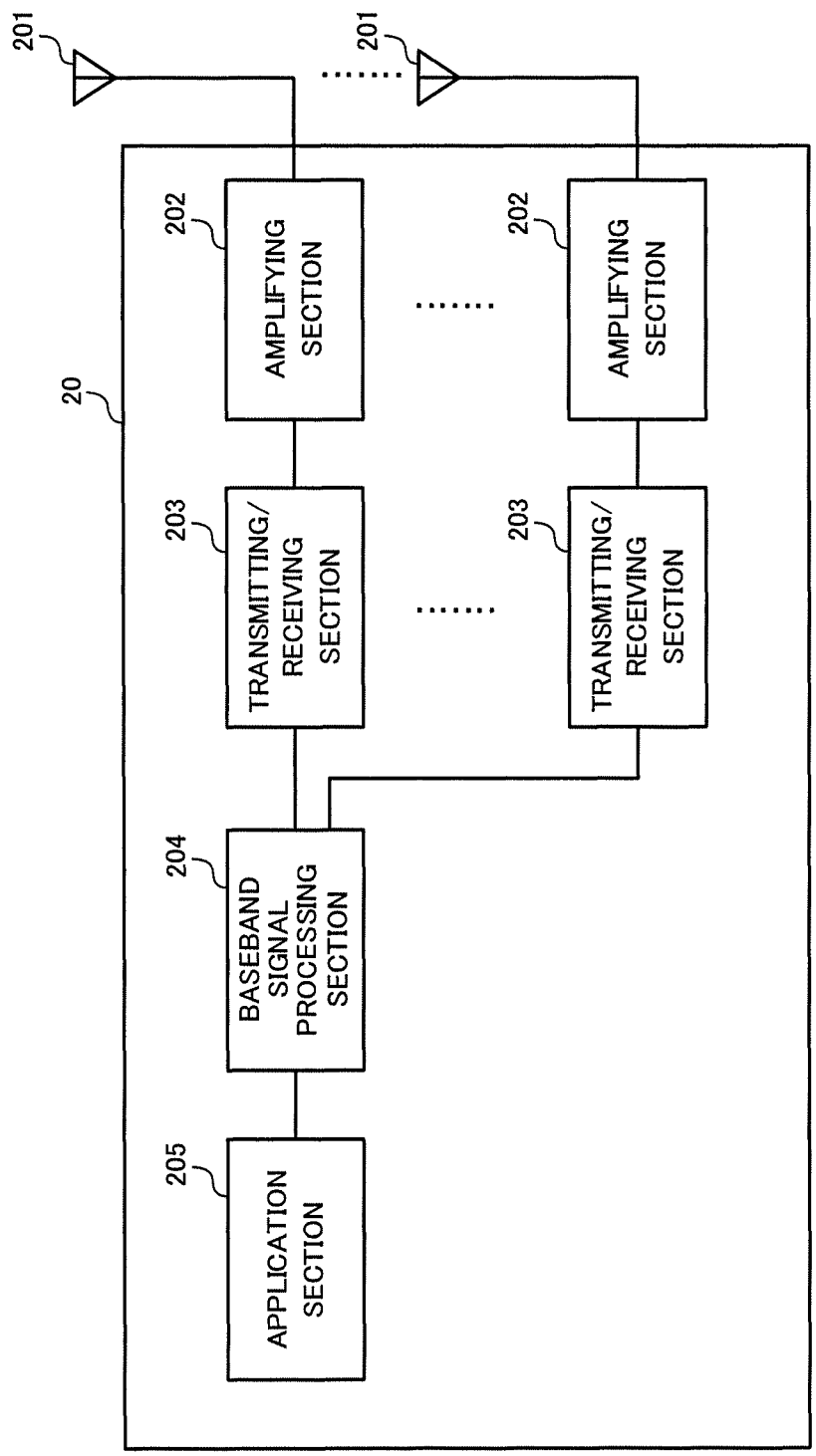
FIG. 13 is a diagram to show an example of an overall structure of a user terminal according to one or more embodiments disclosed herein.

FIG. 13 is a diagram to show an example of an overall structure of a user terminal according to the present embodiment. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

A radio frequency signal that is received in the transmitting/receiving antenna 201 is amplified in the amplifying section 202. The transmitting/receiving section 203 receives the downlink signal amplified in the amplifying section 202. The received signal is subjected to frequency conversion and converted into the baseband signal in the transmitting/receiving section 203, and output to the baseband signal processing section 204. The transmitting/receiving section 203 can be constituted by a transmitters/receiver, a transmitting/receiving circuit or a transmitting/receiving device that can be described based on common understanding of the technical field to which one or more embodiments of the present invention pertains. Note that the transmitting/receiving section 203 may be structured as a transmitting/receiving section in one entity, or may be constituted by a transmitting section and a receiving section. Further, the transmitting/receiving section 203 may constitute the transmission section and the receiving section according to one or more embodiments of the present invention.

The transmitting/receiving section 203 receives DCI and/or higher layer signaling that include information about the cells to be scheduled.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to the transmitting/receiving section 203. The baseband signal that is output from the baseband signal processing section 204 is converted into a radio frequency bandwidth in the transmitting/receiving sections 203. The radio frequency signals that are subjected to frequency conversion in the transmitting/receiving sections 203 are amplified in the amplifying sections 202, and transmitted from the transmitting/receiving antennas 201.

Figure 14:
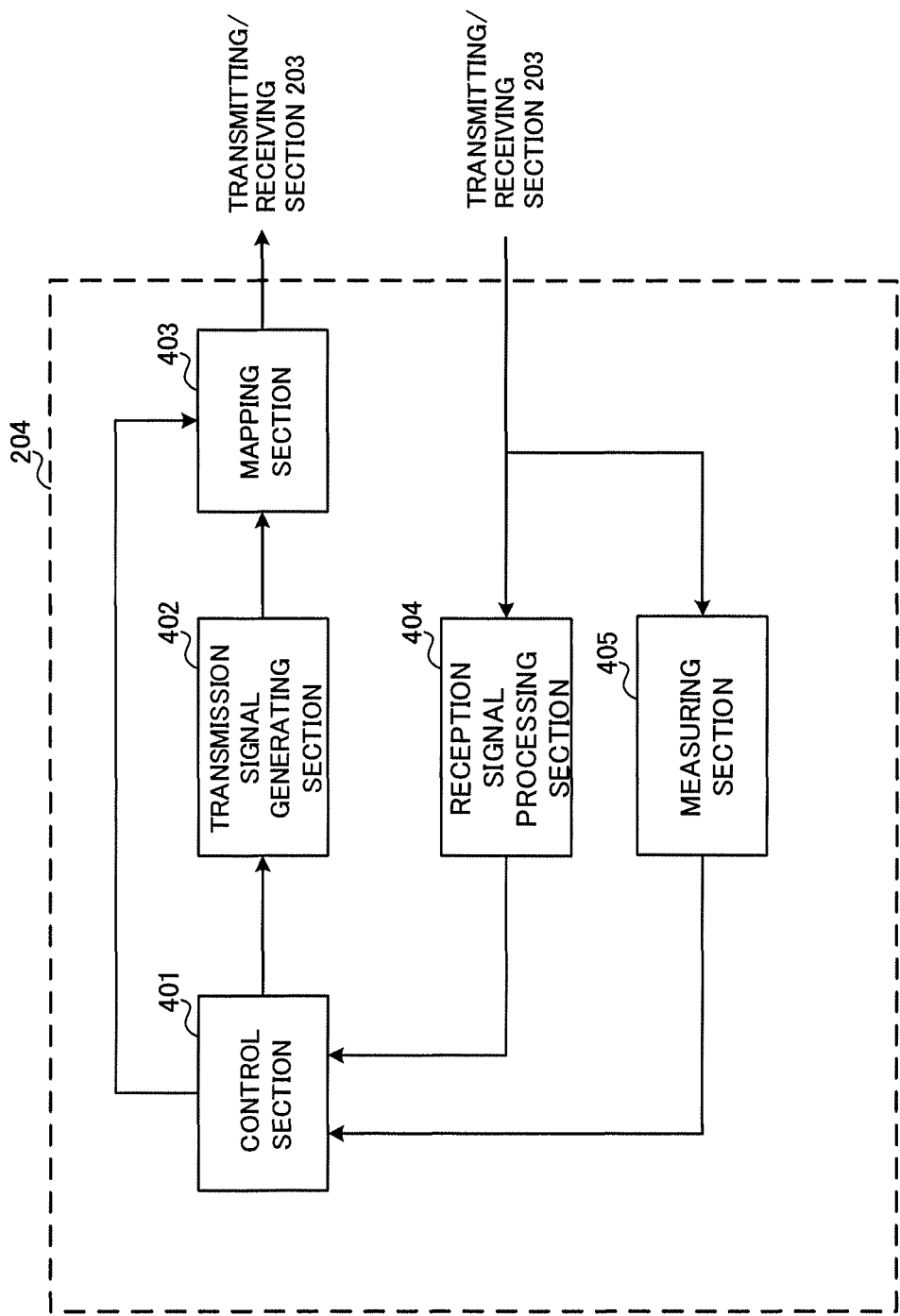
FIG. 14 is a diagram to show an example of a functional structure of a user terminal according to one or more embodiments disclosed herein.

FIG. 14 is a diagram to show an example of a functional structure of a user terminal according to the present embodiment. Note that, although FIG. 14 primarily shows functional blocks that pertain to characteristic parts of the present embodiment, the user terminal 20 has other functional blocks that are necessary for radio communication as well. As shown in FIG. 14, the baseband signal processing section 204 provided in the user terminal 20 at least has a control section 401, a transmission signal generating section 402, a mapping section 403, a received signal processing section 404 and a measurement section 405.

The control section 401 controls the whole of the user terminal 20. For the control section 401, a controller, a control circuit or a control device that can be described based on common understanding of the technical field to which one or more embodiments of the present invention pertains can be used. Further, the control section 401 can constitute the control section according to one or more embodiments of the present invention.

The control section 401, for example, controls the generation of signals in the transmission signal generating section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals (signals transmitted in the PDCCH/EPDCCH) and downlink data signals (signals transmitted in the PDSCH) transmitted from the radio base station 10, from the received signal processing section 404. The control section 401 controls the generation of uplink control signals (for example, delivery acknowledgement signals (HARQ-ACKs) and so on) and uplink data signals based on the downlink control signals, the results of deciding whether or not re transmission control is necessary for the downlink data signals, and so on.

When information about the cells to be scheduled is included in DCI included in the downlink control signals or in higher layer signaling, the control section 401 controls the transmission of ACK/NACK based on this information about the cells to be scheduled.

For example, the control section 401 may determine the codebook size of ACK/NACK based on bit maps included in DCI and/or DL MAC CEs received in the received signal processing section 404. Further, the control section 401 may make the transmission signal generation section 402 to generate an ACK/NACK bit sequence (first embodiment).

Further, the control section 401 may determine the codebook size of ACK/NACK based on TDAIs included in DCI and/or DL MAC CEs received in the received signal processing section 404. Also, the control section 401 may make the transmission signal generation section 402 to generate an ACK/NACK bit sequence based on the decoding result of the PDSCH (second embodiment).

Further, the control section 401 may determine the codebook size of ACK/NACK based on TDAIs included in DCI and/or DL MAC CEs received in the received signal processing section 404. Also, the control section 401 may execute control so that an ACK/NACK bit sequence is generated based on the ADAIs included in DCI and/or DL MAC CEs (third embodiment).

Further, the control section 401 may determine the codebook size of ACK/NACK based on TDAIs and ADAIs included in DCI and/or DL MAC CEs received in the received signal processing section 404. Also, the control section 401 may control the transmission signal generation section 402 to generate an ACK/NACK bit sequence based on the ADAIs and the PDSCH decoding results (fourth embodiment).

The transmission signal generating section 402 generates uplink signals (uplink control signals, uplink data signals, uplink reference signals and so on) based on commands from the control section 401, and outputs these signals to the mapping section 403. The transmission signal generating section 402 can be constituted by a signal generator, a signal generating circuit or a signal generating device that can be described based on common understanding of the technical field to which one or more embodiments of the present invention pertains.

For example, the transmission signal generating section 402 generates uplink control signals such as delivery acknowledgement signals (HARQ-ACKs), channel state information (CSI) and so on, based on commands from the control section 401. The modulation order (modulation scheme) and the number of PRBs to apply to the transmission of the channel state information can be determined based on a command from the control section 401. Also, the transmission signal generating section 402 generates uplink data signals based on commands from the control section 401. For example, when a UL grant is included in a downlink control signal that is reported from the radio base station 10, the control section 401 commands the transmission signal generating section 402 to generate an uplink data signal.

The mapping section 403 maps the uplink signals generated in the transmission signal generating section 402 to radio resources based on commands from the control section 401, and output the result to the transmitting/receiving sections 203. The mapping section 403 can be constituted by a mapper, a mapping circuit or a mapping device that can be described based on common understanding of the technical field to which one or more embodiments of the present invention pertains.

The received signal processing section 404 performs receiving processes (for example, demapping, demodulation, decoding and so on) of received signals that are input from the transmitting/receiving section 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or a signal processing device that can be described based on common understanding of the technical field to which one or more embodiments of the present invention pertains. Also, the received signal processing section 404 can constitute the receiving section according to one or more embodiments of the present invention.

The received signal processing section 404 output the decoded information that is acquired through the receiving processes to the control section 401. The received signal processing section 404 outputs, for example, broadcast information, system information, RRC signaling, DCI and so on, to the control section 401. Also, the received signal processing section 404 outputs the received signals, the signals after the receiving processes and so on to the measurement section 405.

The measurement section 405 conducts measurements with respect to the received signals. The measurement section 405 can be constituted by a measurer, a measurement circuit or a measurement device that can be described based on common understanding of the technical field to which one or more embodiments of the present invention pertains. The measurement section 405 may measure, for example, the received power (for example, RSRP), the received quality (for example, RSRQ), the channel states and so on of the received signals. The measurement results may be output to the control section 401.

Note that the block diagrams that have been used to describe the above embodiments show blocks in functional units. These functional blocks (components) may be implemented in arbitrary combinations of hardware and software.

Also, the means for implementing each functional block is not particularly limited. That is, each functional block may be implemented with one physically-integrated device, or may be implemented by connecting two physically-separate devices via radio or wire and using these multiple devices.

For example, part or all of the functions of the radio base station 10 and the user terminal 20 may be implemented by using hardware such as an ASIC (Application-Specific Integrated Circuit), a PLD (Programmable Logic Device), an FPGA (Field Programmable Gate Array) and so on. Also, the radio base stations 10 and user terminals 20 may be implemented with a computer device that includes a processor (CPU), a communication interface for connecting with networks, a memory and a computer-readable storage medium that holds programs. That is, the radio base stations and user terminals according to an embodiment of the present invention may function as computers that execute the processes of the radio communication method of one or more embodiments of the present invention.

Here, the processor and the memory are connected with a bus for communicating information. Also, the computer-readable recording medium is a storage medium such as, for example, a flexible disk, an opto-magnetic disk, a ROM (Read Only Memory), an EPROM (Erasable Programmable ROM), a CD-ROM (Compact Disc-ROM), a RAM (Random Access Memory), a hard disk and so on. Also, the programs may be transmitted from the network through, for example, electric communication channels. Also, the radio base stations 10 and user terminals 20 may include input devices such as input keys and output devices such as displays.

The functional structures of the radio base stations 10 and user terminals 20 may be implemented with the above-described hardware, may be implemented with software modules that are executed on the processor, or may be implemented with combinations of both. The processor controls the whole of the user terminals by running an operating system. Also, the processor reads programs, software modules and data from the storage medium into the memory, and executes various types of processes.

Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Also, software and commands may be transmitted and received via communication media. For example, when software is transmitted from a website, a server or other remote sources by using wired technologies such as coaxial cables, optical fiber cables, twisted-pair cables and digital subscriber lines (DSL) and/or wireless technologies such as infrared radiation, radio and microwaves, these wired technologies and/or wireless technologies are also included in the definition of communication media.

Note that the terminology used in this description and the terminology that is needed to understand this description may be replaced by other terms that convey the same or similar meanings. For example, "channels" and/or "symbols" may be replaced by "signals" (or "signaling"). Also, "signals" may be "messages." Furthermore, "component carriers" (CCs) may be referred to as "carrier frequencies," "cells" and so on.

Also, the information and parameters described in this description may be represented in absolute values or in relative values with respect to a predetermined value, or may be represented in other information formats. For example, radio resources may be specified by indices.

The information, signals and/or others described in this description may be represented by using a variety of different technologies. For example, data, instructions, commands, information, signals, bits, symbols and chips, all of which may be referenced throughout the description, may be represented by voltages, currents, electromagnetic waves, magnetic fields or particles, optical fields or photons, or any combination of these.

The examples/embodiments illustrated in this description may be used individually or in combinations, and may be switched depending on the implementation. Also, a report of predetermined information (for example, a report to the effect that "X holds") does not necessarily have to be sent explicitly, and can be sent implicitly (by, for example, not reporting this piece of information).

Reporting of information is by no means limited to the example s/embodiments described in this description, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, MAC (Medium Access Control) signaling, and broadcast information (the MIB (Master Information Block) and SIBs (System Information Blocks))), other signals or combinations of these. Also, RRC signaling may be referred to as "RRC messages," and can be, for example, an RRC connection setup message, RRC connection reconfiguration message, and so on.

The examples/embodiments illustrated in this description may be applied to LTE (Long Term Evolution), LTE-A (LTE-Advanced), SUPER 3G, IMT-Advanced, 4G, 5G, FRA (Future Radio Access), CDMA 2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), and other adequate systems, and/or next-generation systems that are enhanced based on these.

The order of processes, sequences, flowcharts and so on that have been used to describe the examples/embodiments herein may be re-ordered as long as inconsistencies do not arise. For example, although various methods have been illustrated in this description with various components of steps in exemplary orders, the specific orders that illustrated herein are by no means limiting.

Now, although exemplary embodiments of the present invention have been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:
1. A user terminal, comprising:
a transmitter that transmits delivery acknowledgement signals (ACK/NACK) in response to downlink (DL) signals transmitted from a plurality of cells;
a receiver that receives information about a value to represent a total number of cells to be scheduled and a cumulative number of the cells from downlink control information unless the downlink control information is transmitted in a common search space; and
a processor that controls transmission of the ACK/NACK based on the information about the value to represent the total number of the cells to be scheduled and the cumulative number of the cells,
wherein when the downlink control information is transmitted in the common search space, the downlink control information transmitted in the common search space does not include the information about at least one of the value to represent the total number of the cells to be scheduled and the cumulative number of the cells, and
wherein the value to represent the total number of the cells is included with a same value in all downlink control information within a period.

2. The user terminal according to claim 1, wherein the processor controls a bit size of the ACK/NACK to feed back based on the information about the value to represent the total number of the cells to be scheduled and the cumulative number of the cells.

3. The user terminal according to claim 2, wherein, when a maximum value of the cumulative number and the value to represent the total number are different, the processor determines that detection has failed in a given cell.

4. The user terminal according to claim 2, wherein when the receiver is not able to receive a cumulative value of a given cell, the processor decides to feed back NACK in response to a DL signal of the given cell.

5. The user terminal according to claim 2, wherein when the downlink control information does not include at least one of the cumulative value and the value to represent the total number, the processor controls the transmission of the ACK/NACK by using PUCCH format 1a/1b.

6. The user terminal according to claim 2, wherein when the receiver has detected the downlink control information only in the common search space, the processor controls the transmission of the ACK/NACK by applying PUCCH format 1a/1b.

7. The user terminal according to claim 1, wherein, when a maximum value of the cumulative number and the value to represent the total number are different, the processor determines that detection has failed in a given cell.

8. The user terminal according to claim 7, wherein when the receiver is not able to receive a cumulative value of a given cell, the processor decides to feed back NACK in response to a DL signal of the given cell.

9. The user terminal according to claim 7, wherein when the downlink control information does not include at least one of the cumulative value and the value to represent the total number, the processor controls the transmission of the ACK/NACK by using PUCCH format 1a/1b.

10. The user terminal according to claim 1, wherein when the receiver is not able to receive a cumulative value of a given cell, the processor decides to feed back NACK in response to a DL signal of the given cell.

11. The user terminal according to claim 10, wherein when the downlink control information does not include at least one of the cumulative value and the value to represent the total number, the processor controls the transmission of the ACK/NACK by using PUCCH format 1a/1b.

12. The user terminal according to claim 1, wherein when the downlink control information does not include at least one of the cumulative value and the value to represent the total number, the processor controls the transmission of the ACK/NACK by using PUCCH format 1a/1b.

13. The user terminal according to any one of claim 1, wherein when the receiver has detected the downlink control information only in the common search space, the processor controls the transmission of the ACK/NACK by applying PUCCH format 1a/1b.

14. A radio base station that communicates with a user terminal connected to a plurality cells, the radio base station comprising:
a transmitter that transmits information about a value to represent a total number of cells to be scheduled and a cumulative number of the cells by using downlink control information unless the downlink control information is transmitted in a common search space; and
a receiver that receives delivery acknowledgement signals (ACK/NACK) that is transmitted from the user terminal based on the information about the value to represent the total number of the cells to be scheduled and the cumulative number of the cells,
wherein when the transmitter transmits the downlink control information in the common search space, the downlink control information transmitted in the common search space does not include the information about at least one of the value to represent the total number of the cells to be scheduled and the cumulative number of the cells, and
wherein the value to represent the total number of the cells is included with a same value in all downlink control information within a period.

15. A radio communication method for a user terminal that communicates by connecting to a plurality of cells, the radio communication method comprising:
receiving information about a value to represent a total number of cells to be scheduled and a cumulative number of the cells from downlink control information unless the downlink control information is transmitted in a common search space; and
transmitting delivery acknowledgement signals (ACK/NACK) based on the information about the value to represent the total number of the cells to be scheduled and the cumulative number of the cells,
wherein when the downlink control information is transmitted in the common search space, the downlink control information transmitted in the common search space does not include the information about at least one of the value to represent the total number of the cells to be scheduled and the cumulative number of the cells, and
wherein the value to represent the total number of the cells is included with a same value in all downlink control information within a period.

* * * * *